United States Patent
Hullette et al.

(10) Patent No.: US 11,809,809 B2
(45) Date of Patent: Nov. 7, 2023

(54) CLICKABLE EMOJI

(71) Applicant: Klickafy, LLC, East Grand Forks, MN (US)

(72) Inventors: Brian Hullette, Kingsport, TN (US); Mark Patrick Judovsky, East Grand Forks, MN (US)

(73) Assignee: Klickafy, LLC, East Grand Forks, MN (US)

( * ) Notice: Subject to any disclaimer, the term of this patent is extended or adjusted under 35 U.S.C. 154(b) by 0 days.

(21) Appl. No.: 16/687,208

(22) Filed: Nov. 18, 2019

(65) Prior Publication Data
US 2020/0081960 A1 Mar. 12, 2020

Related U.S. Application Data

(63) Continuation of application No. 14/259,555, filed on Apr. 23, 2014, now Pat. No. 10,482,163.

(51) Int. Cl.
*G06F 40/134* (2020.01)
*G06Q 50/00* (2012.01)
*H04L 51/04* (2022.01)
*H04L 51/10* (2022.01)

(52) U.S. Cl.
CPC .......... *G06F 40/134* (2020.01); *G06Q 50/01* (2013.01); *H04L 51/04* (2013.01); *H04L 51/10* (2013.01)

(58) Field of Classification Search
CPC ....... G06F 40/134; G06Q 50/01; H04L 51/04; H04L 51/10
See application file for complete search history.

(56) References Cited

U.S. PATENT DOCUMENTS

| | | | |
|---|---|---|---|
| 6,693,652 B1 | 2/2004 | Barrus et al. | |
| 8,290,478 B2* | 10/2012 | Shim | G06Q 10/107 |
| | | | 455/414.4 |
| 9,137,185 B2 | 9/2015 | Costenaro et al. | |
| 9,417,765 B1* | 8/2016 | Lewis | G06F 16/748 |
| 9,906,615 B1* | 2/2018 | Jaskiewicz | G06F 40/14 |
| 2003/0046690 A1 | 3/2003 | Miller | |
| 2004/0205629 A1* | 10/2004 | Rosenholtz | G06F 16/95 |
| | | | 707/E17.107 |

(Continued)

FOREIGN PATENT DOCUMENTS

WO 2012121555 A2 9/2012

OTHER PUBLICATIONS

International Preliminary Report on Patentability for corresponding PCT/US2014/060731, dated Oct. 25, 2016, 6 pages.

(Continued)

*Primary Examiner* — Hope C Sheffield
(74) *Attorney, Agent, or Firm* — Patterson Intellectual Property Law

(57) ABSTRACT

Hyperlinked icons, images, and emoji may be shared by users in a real-time messaging environment, such as text messaging. A user may send a message including a clickable emoji to a receiving user, where the received clickable emoji is displayed in the message. If the received clickable emoji is selected by the receiving user, web content linked to the emoji is retrieved and displayed. Messaging server(s) monitor messages, events, and social trends collecting contextual data. Content providers use collected contextual data to efficiently deliver targeted content.

28 Claims, 25 Drawing Sheets

(56) References Cited

U.S. PATENT DOCUMENTS

| | | | |
|---|---|---|---|
| 2005/0156873 A1* | 7/2005 | Walter | H04L 51/04 345/156 |
| 2005/0204309 A1* | 9/2005 | Szeto | G06F 3/0482 715/861 |
| 2007/0136419 A1 | 6/2007 | Taylor et al. | |
| 2007/0266090 A1 | 11/2007 | Len | |
| 2008/0281930 A1* | 11/2008 | Hartselle | G06Q 10/107 709/206 |
| 2010/0017289 A1 | 1/2010 | Sah et al. | |
| 2011/0010737 A1 | 1/2011 | Bouazizi et al. | |
| 2012/0284093 A1* | 11/2012 | Evans | H04W 4/21 705/14.1 |
| 2012/0304074 A1 | 11/2012 | Ooi et al. | |
| 2013/0086190 A1* | 4/2013 | Durand | H04L 51/046 709/206 |
| 2013/0124309 A1 | 5/2013 | Traasdahl et al. | |
| 2013/0159431 A1 | 6/2013 | Berry et al. | |
| 2013/0159432 A1 | 6/2013 | Deering et al. | |
| 2013/0159433 A1* | 6/2013 | Chavan | G06Q 30/0241 709/206 |
| 2013/0339983 A1* | 12/2013 | Dai | H04L 51/08 719/318 |
| 2014/0092101 A1 | 4/2014 | Lee et al. | |
| 2014/0101252 A1 | 4/2014 | Kolodziej | |
| 2014/0201527 A1* | 7/2014 | Krivorot | G06F 21/6209 713/168 |
| 2014/0289259 A1 | 9/2014 | Tamma et al. | |
| 2018/0032997 A1* | 2/2018 | Gordon | G06Q 30/0269 |

OTHER PUBLICATIONS

International Search Report for corresponding PCT/US2014/060731, dated Jan. 14, 2015, 3 pages.

Written Opinion of the International Searching Authority for corresponding PCT/US2014/060731, dated Jan. 14, 2015, 5 pages.

* cited by examiner

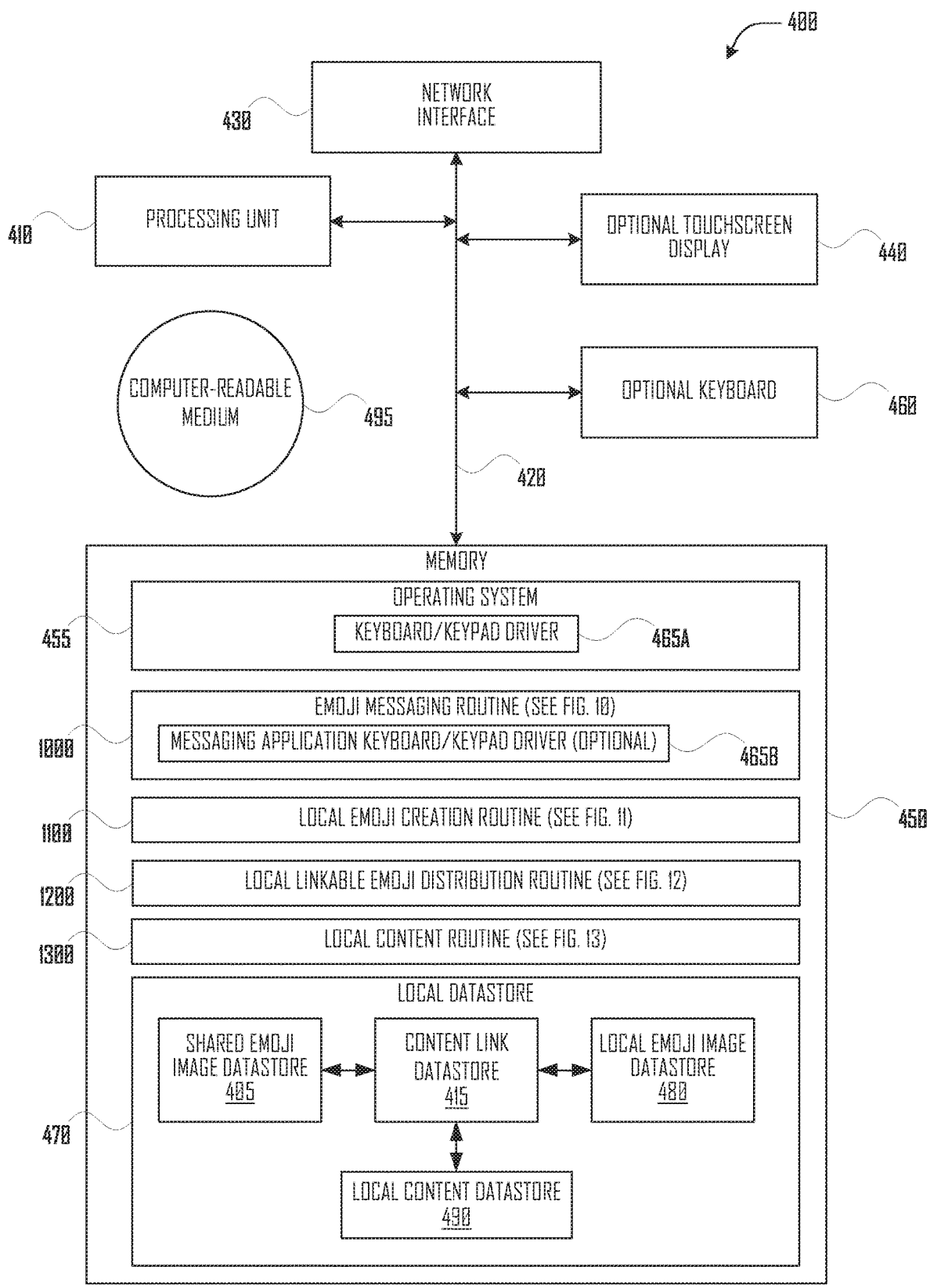

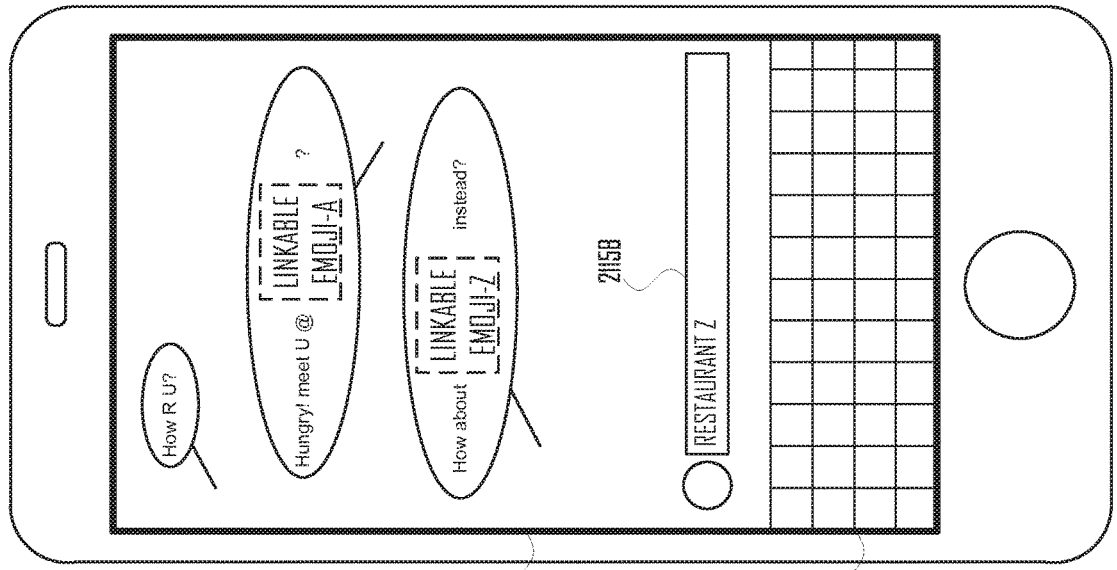
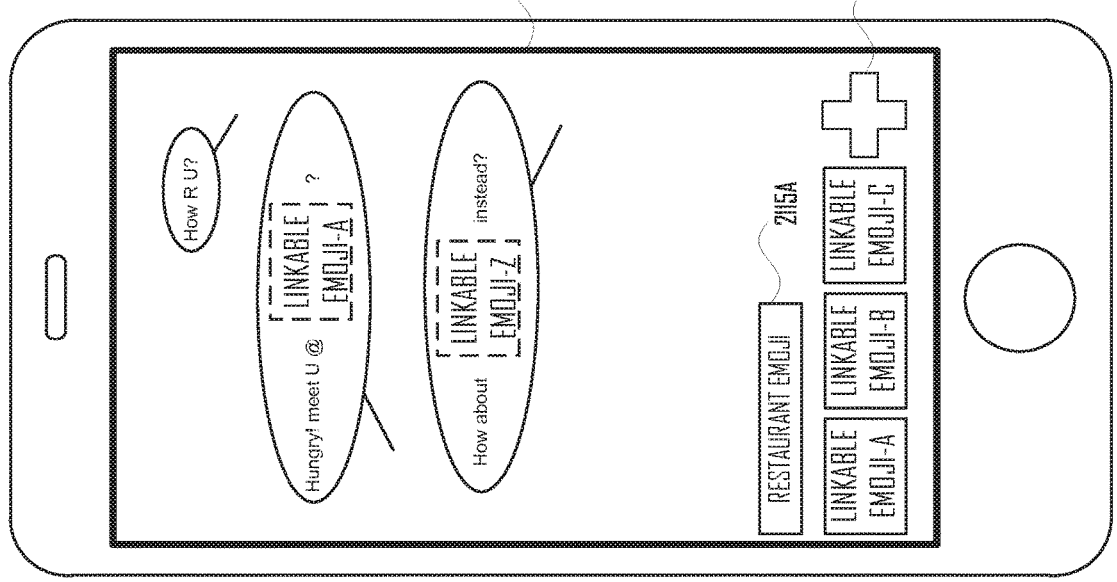
Fig. 21

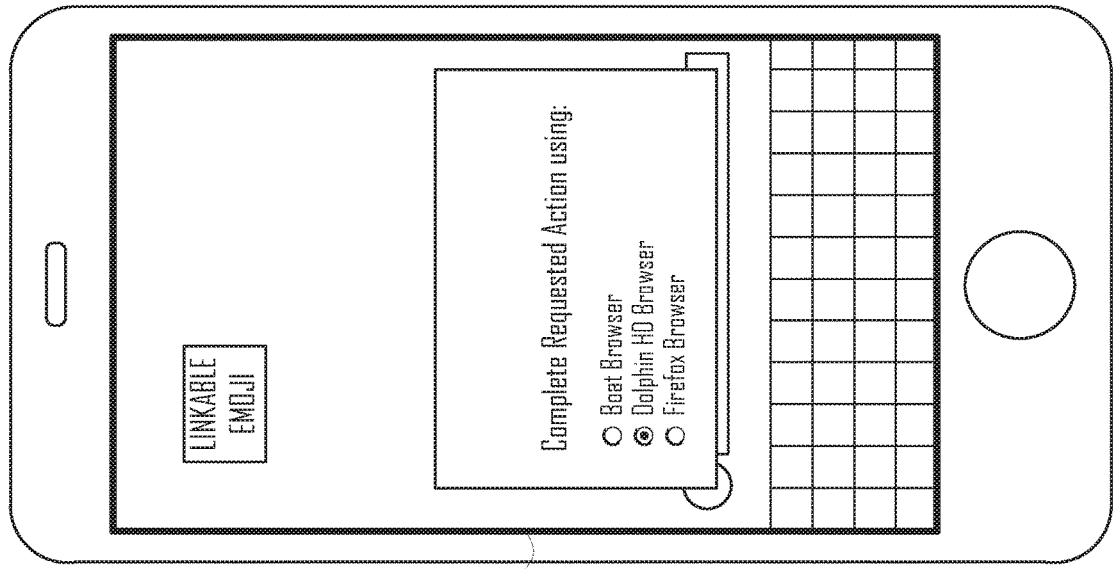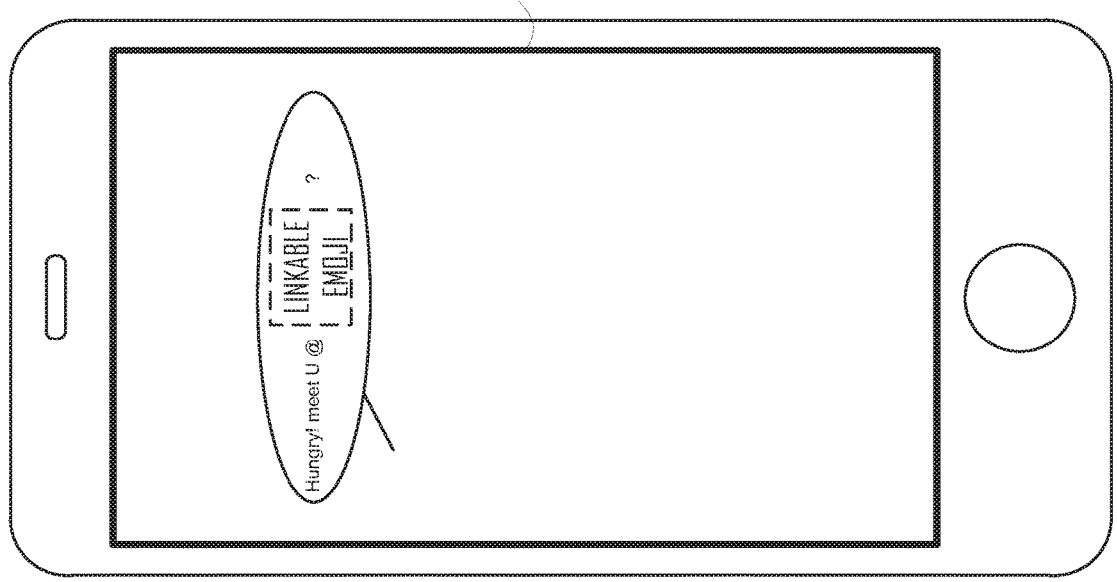
Fig.22

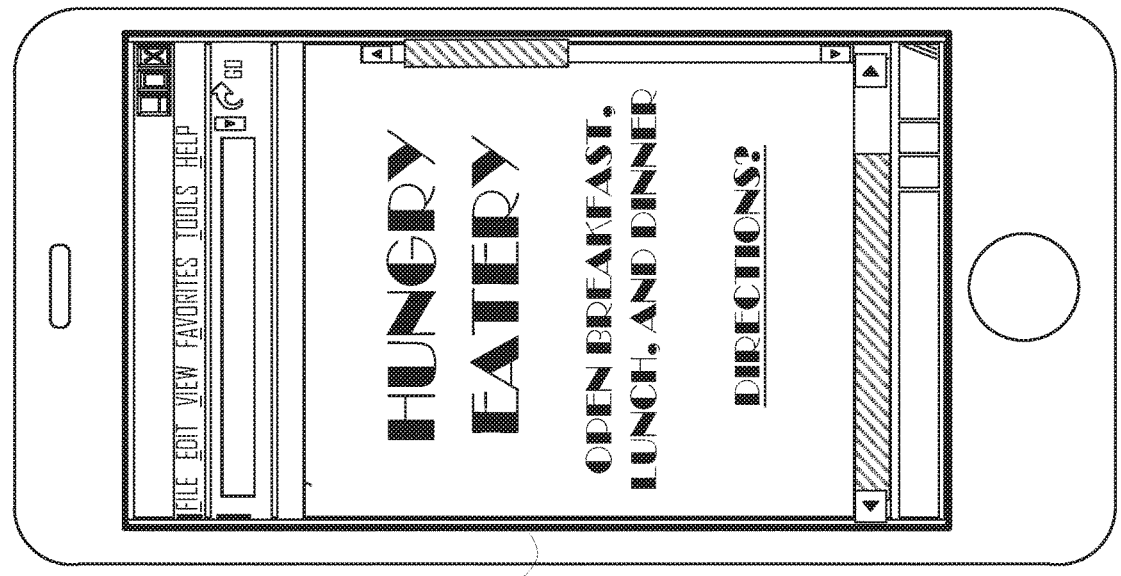
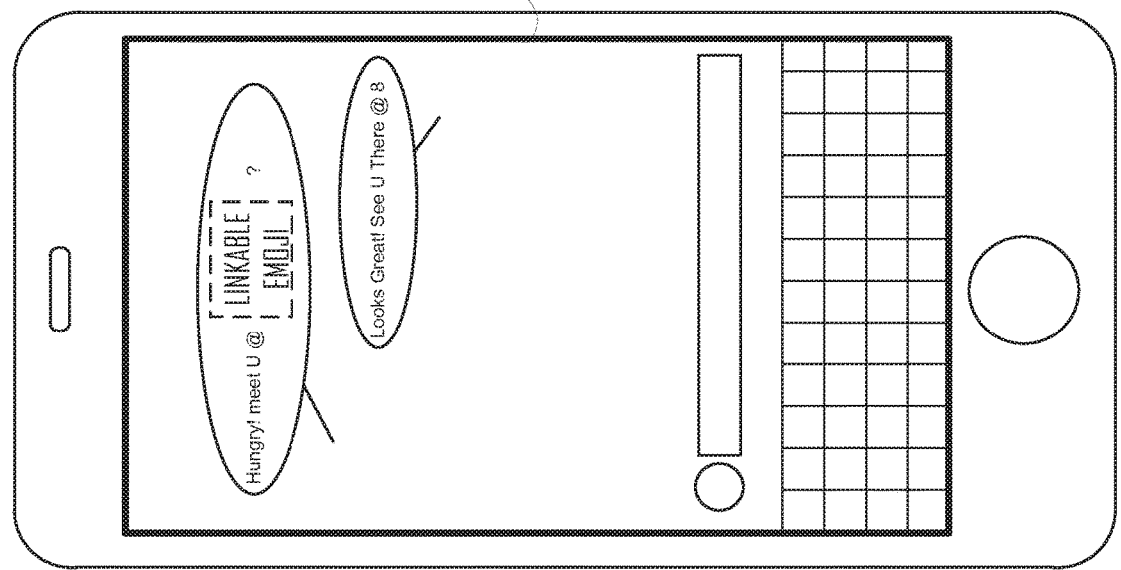
Fig. 23

CLICKABLE EMOJI

FIELD

The present disclosure relates to clickable instant messaging. More particularly, to systems and methods for providing hyperlinked icons, images, and emoji in a real-time messaging environment, such as text messaging.

BACKGROUND

Computer systems are regularly developing new methods of interacting with users to improve the user experience and facilitate new functionality. For example, with the development of video display devices, an older punch card interface gave way to a text-based interface. Later as the quality of available display devices improved, the text-based interfaces were largely supplanted by graphical user interfaces (GUI), which often use computer icons to help launch programs instead of requiring text commands.

A notable exception to the digital industry's transition from text-based interfaces to graphical user interfaces has been in communication software. More specifically messaging systems, such as text messaging, instant messaging, and email are still largely text-based. Still, to overcome some of the limitations of text messaging, users often use a text messaging shorthand. A portion of this messaging shorthand, referred to as emoticons and/or emoji, produces text-based images to convey additional information frequently involving the emotional context of the message. Emoticons, like the smiley, are both a response to the limited storage and transmission bandwidth used in electronic messaging systems and the need to provide emotive context to a text message.

Emoticons have become both abundant and more sophisticated in their keyboard representations of varying emotions. In fact many emoticons, like the smiley, have developed from pure keyboard character combinations into real icons that are widely used in all forms of electronic communications. In adding an emotional overlay to the text, the emoticons have also enabled electronic messages to substitute for and frequently supplant voice-to-voice messaging. However, despite these advances, emoticons still remain relative static with respect to the content being added to a message. For example, a smiley sent in a message yesterday remains a smiley in the message even if there might be a more appropriate emoticon now, such as a sad face or green face. Moreover, due to the limited storage and transmission bandwidth used in electronic real-time messaging systems, emoticons have never been linkable to additional content.

BRIEF DESCRIPTION OF THE DRAWINGS

The aspects of the present disclosure are best understood from the detailed description when read in relation to the accompanying drawings. The drawings illustrate a variety of different aspects, features, and embodiments of the disclosure, as such it is understood that the illustrated embodiments are merely representative and not exhaustive in scope. The disclosure will now be described with reference to the accompanying drawings, wherein like numbers refer to like elements.

FIG. 4 illustrates several components of a messaging client device in accordance with one embodiment.

FIG. 21 illustrates side by side screenshots of a sender mobile messaging device and a recipient mobile messaging device exchanging real-time messages with embedded linkable emoji in accordance with one embodiment.

FIG. 22 illustrates side by side screenshots of a sender mobile messaging device and a recipient mobile messaging device to share a content link associated with an embedded linkable emoji sent in a real-time message in accordance with one embodiment.

FIG. 23 illustrates side by side screenshots of a sender mobile messaging device and a recipient mobile messaging device to share content associated with an embedded linkable emoji sent in a real-time message in accordance with one embodiment.

DETAILED DESCRIPTION

Figure 1:
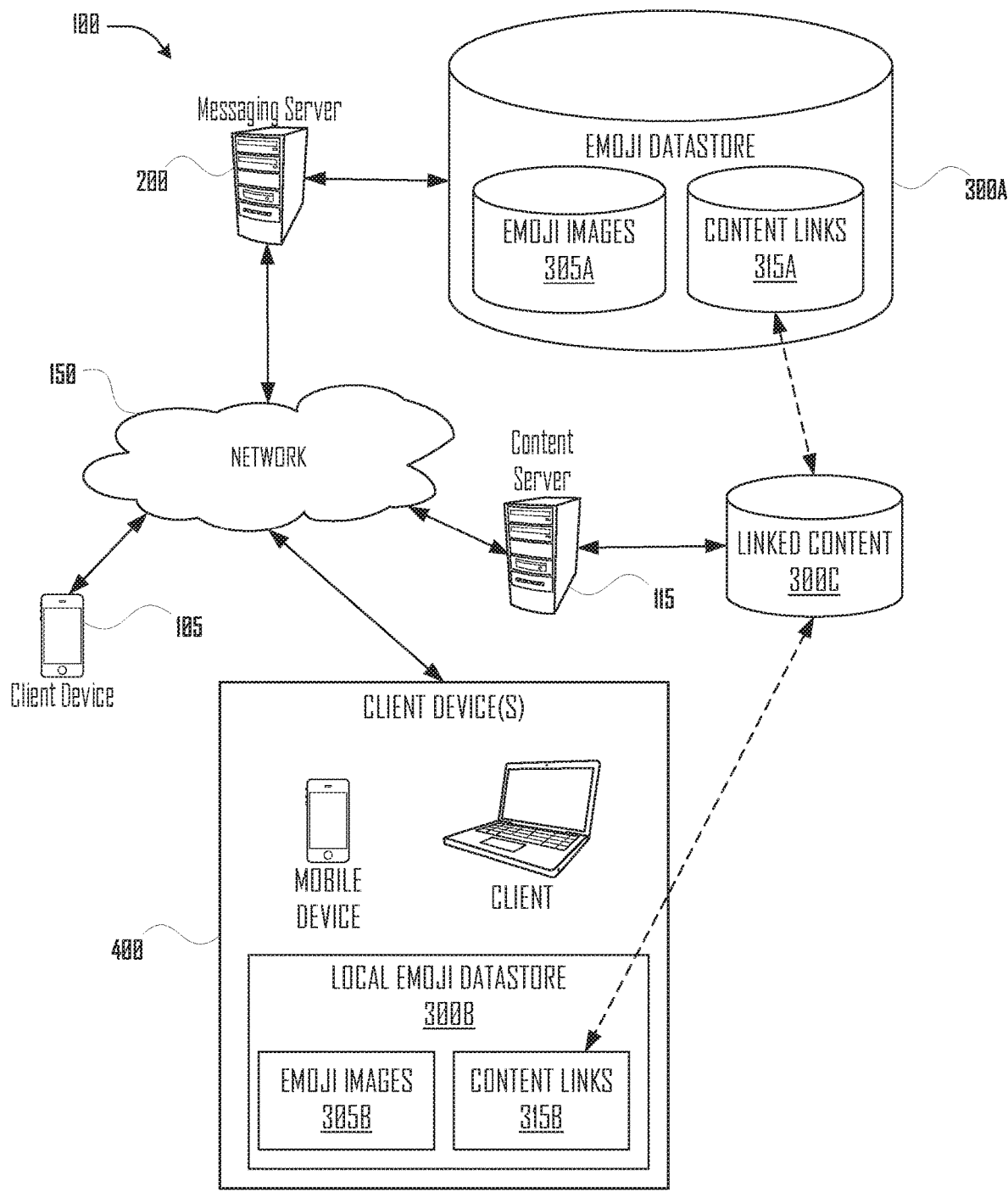
FIG. 1 illustrates a suitable real-time messaging environment wherein messages that include hyperlinked icons, images, and/or emoji may be shared between different client devices in accordance with at least one embodiment.

In accordance with various embodiments of the invention, clickable emoji messaging systems and methods are described that overcome the hereinafore-mentioned disadvantages of the heretofore-known messaging methods and systems of this general type and that provide for icons, images, and emoji hyperlinked to additional content in a real-time messaging environment. More specifically, the described embodiments provide linkable emoji in messages sent on a real-time messaging platform, each linkable emoji includes an emoji image or text pattern for direct insertion into the message and at least one content link to selectively direct a mobile browser to additional content associated with each linkable emoji. Linkable emoji represent a new messaging language that shortens and improves communication between sender and recipient. Often a user may not know how to spell a desired target, but recognize the logo associated with a business or product. The linkable emoji allow the user to deploy logos and symbols to communicate. New linkable emoji may both be organically distributed and/or shared via sponsored distribution. The messaging system collects multiple types of logs and contextual data from participating client devices and content providers to deliver useful analytics include social metrics based on corresponding users, a particular emoji, link, and corresponding content. In fact, the described clickable emoji messaging system can selectively and/or conditionally designate a link and thereby content, based in part on collected client device information. Care is taken to validate collected analytics, as many modern messaging systems are also installed on mobile devices, such as smartphones, that have a variety of connection options and/or use multiple connection methods (e.g., cellular, spread spectrum, radio, microwave, WiMAX and the like) to connect to the network and can skew collected data depending on which connection type is used. Moreover, as the clickable emoji messaging system interacts with dynamic web-based content, the traditionally static message must also consider the conditional spoliation of the message. In some embodiments, the linked content associated with the linkable emoji may only be conditionally available. For example, the linked content may only be downloadable for by a specific target user, at a specific time period, near a specific location, when a specific condition exists, for a specific number of or some combination of these spoliation factors.

In the following detailed description, reference is made to the accompanying drawings which form a part hereof wherein like numerals designate like parts throughout, and in which are shown, by way of illustration, specific embodiments in which the disclosure may be practiced. Various aspects of the illustrative embodiments will be described using terms commonly employed by those skilled in the art to convey the substance of their work to others skilled in the art. However, the embodiments described herein may be practiced with only some of the described aspects. For purposes of explanation, specific numbers, materials, and configurations may be set forth to provide a thorough understanding of the illustrative embodiments. However, the embodiments described herein may be practiced without the specific details. In other instances, well-known features are omitted or simplified in order not to obscure the illustrative embodiments. Further, various operations and/or communications may be described as multiple discrete operations and/or communications, in turn, in a manner that may be helpful in understanding the embodiments described herein; however, the order of description should not be construed as to imply that these operations and/or communications are necessarily order dependent. In particular, these operations and/or communications need not be performed in the order of presentation.

The detailed description that follows is represented largely in terms of processes and symbolic representations of operations by conventional computing components, including a processor, memory storage devices for the processor, connected display devices and input devices. Furthermore, these processes and operations may utilize conventional computing components in a distributed computing environment; including remote file servers, servers, publishing resources, and/or memory storage devices. Each of these conventional distributed computing components is accessible by the processor via a network. In a distributed computing environment, clients, servers, and client/servers may be, for example, smartphones, mainframes, minicomputers, workstations, or personal computers. Most services in a distributed computing environment can be grouped into distributed file system, distributed computing resources, and messaging. A distributed file system provides a client with transparent access to part of the mass storage of a remote network device, such as a server. Distributed computing resources provide a client with access to computational or processing power of remote network devices, such as a cloud server. Messaging allow a client to manage the exchange of data and information between other device connected to the network. It is to be understood that other embodiments may be utilized and structural or logical changes may be made without departing from the scope of the present disclosure. Therefore, the following detailed description is not to be taken in a limiting sense, and the scope of a portion of the present disclosure is defined by the claims and appended drawings and their equivalents.

Throughout the specification and drawings, the following terms take at least the meanings explicitly associated herein, unless the context clearly dictates otherwise. The meanings identified below are not intended to limit the terms, but merely provide illustrative examples for use of the terms. The meaning of "a," "an," and "the" may include reference to both the singular and the plural. Reference in the specification to "one embodiment" or "an embodiment" means that a particular feature, structure, or characteristic described in connection with the embodiment is included in at least one embodiment of the disclosure, but are not necessarily included on all embodiments of the disclosure. The meaning of "in" may include "in" and "on." The phrases "in one embodiment" or "in an embodiment" or "in various embodiments" or "in some embodiments" and the like are used repeatedly. Such phrases in various places in the specification do not necessarily all refer to the same embodiment, but it may unless the context dictates otherwise. The terms "emoji", "icon", "emoticon", and "thumbnail image" may or may not be used interchangeably depending on context and typically refer to either a text pattern, a graphical symbol, and/or pictogram readily recognized as having some well-known significance or embodying certain qualities through literal or figurative meaning. In particular, the word emoji literally means "picture" (e)+"letter" (moji), or a "text pattern" as referenced in various places in the specification, however; in this description the "emoji" term, without additional context, may also often refer to an image/pictogram embodiment of the text pattern. The term "clickable" or "linkable" may or may not be used interchangeably depending on context, and generally mean that a particular item may also designate a hyperlink or connection to additional content that is typically stored remotely, but may in some custom cases alternatively be found locally. The term "connected" or "coupled" can mean a direct connection between items, an indirect connection through one or more intermediaries, or communication between items in a manner that may not constitute a direct mechanical, systematic, physical, or other connection between the items connected. For example, in various embodiments component devices may be connected via a wireless connection that may allow for the exchange of data and/or information between the participating devices. The terms "consumer", "customer", "client" and "user" may or may not be used interchangeably depending on context. The terms "remote" and "local" generally are not interchangeable and specifically reference to two distinct devices, but may not necessarily describe relative proximity depending on context. For example, items may be stored on a local client datastore and a remote server datastore, but the local datastore may actually be farther away if the local client datastore is actually maintained in cloud storage associated with the client. Social metrics as used herein includes click counts, share counts, user preference counts, visit durations, user locations, and other similar social data that may be obtained from data aggregated from various combinations of client devices, social network servers, messaging servers, and content servers.

Reference is now made in detail to the description of the embodiments as illustrated in the drawings. Particular embodiments described in this application provide specific case implementations of messaging systems with clickable emoji, each emoji being linked to additional content available to the recipient upon selection. While embodiments are described in connection with the drawings and related descriptions, there is no intent to limit the scope to the embodiments disclosed herein. On the contrary, the intent is to cover all alternatives, modifications, and equivalents. In alternate embodiments, additional devices, or combinations of illustrated devices, may be added to, or combined, without limiting the scope to the embodiments disclosed herein.

Referring to FIG. 1, a suitable real-time messaging environment 100 is shown wherein messages that include hyperlinked icons, images, and/or emoji may be shared between different client devices (105, 400) in accordance with at least one embodiment. In the environment 100, network 150 connects client device 105, content server 115 with linked content datastore 300C, messaging server 200 with emoji datastore 300A, and originating client device(s) 400 with a local emoji datastore 300B. In one embodiment, the emoji datastore 300A includes emoji images 3005A and content links 315A. In one embodiment the local emoji datastore 300B on the client device 400 include emoji images 305B and content links 315B. Additional features of the distributed emoji datastore 300 are shown in greater detail in FIG. 4 below. In various embodiments, network 150 may include the Internet, a local area network ("LAN"), a wide area network ("WAN"), a wireless data network, a cellular data network, and/or other data network. More specifically, the cellular data network can relate to 3GPP/3GPP2 Radio Technologies like 2G (GSM/GPRS); 3G (UMTS/HSPA/CDMA); and 4G (LTE/HSPA+). Similarly, the wireless data network may include microwave data networks and/or other wireless technologies including WiFi (IEEE 802.11x), NFC, location and Bluetooth. Moreover, it is understood by those of skill in the art that the communication network 150 includes any combination of the above.

In some embodiments, other servers and/or devices (not shown) may also be present. For example, in many embodiments, multiple additional client devices and/or non-client devices may be present. Similarly, in many embodiments, multiple content publishers may also be present. In some embodiments, one or more intermediary application servers and/or platform-provider servers may also be present.

Figure 2:
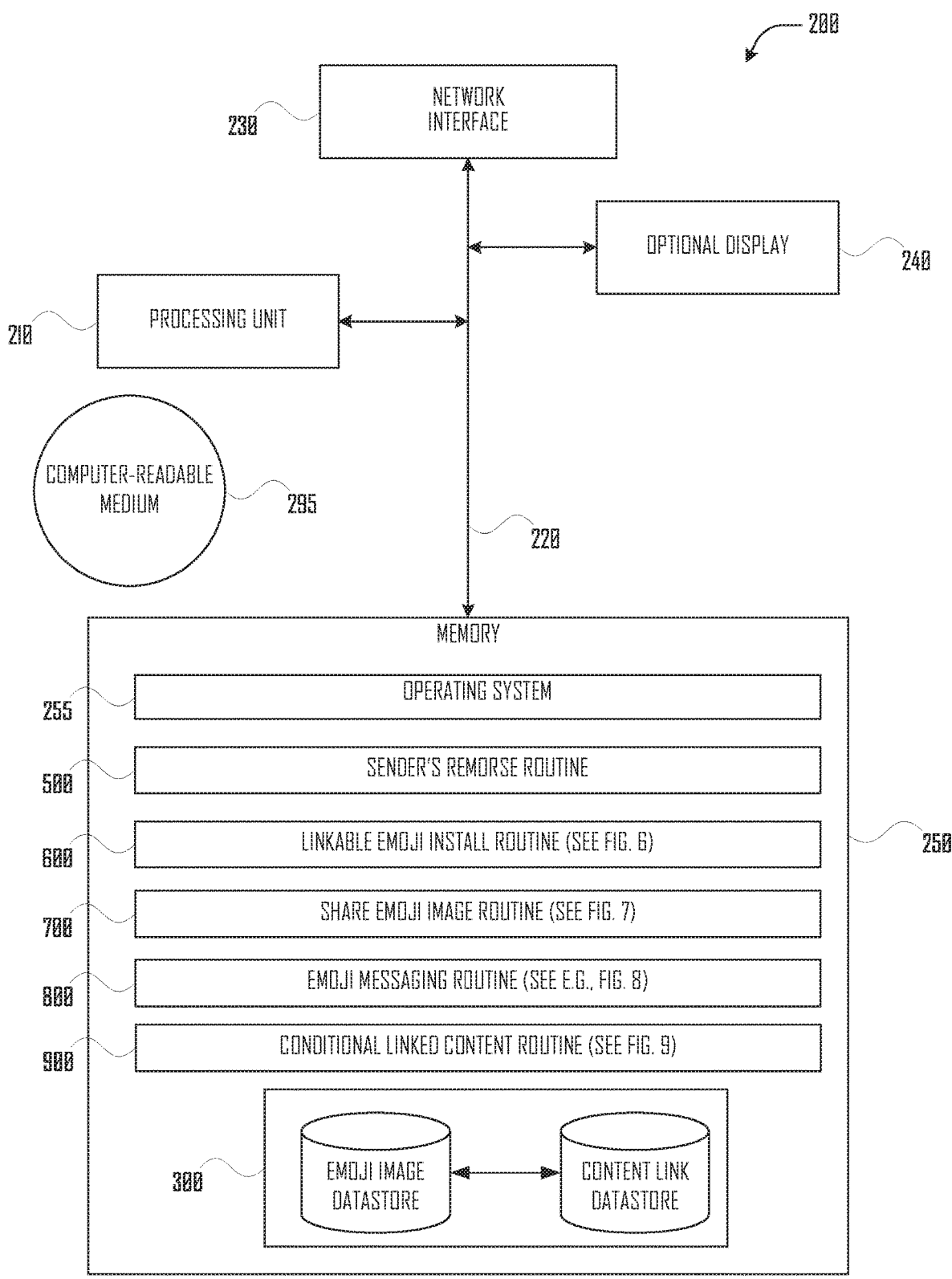
FIG. 2 illustrates several components of a messaging server in accordance with one embodiment.

Referring now to FIG. 2, several components of a messaging server 200 with access to an emoji datastore 300 are shown in accordance with one embodiment. As shown in FIG. 2, the messaging server 200 includes a network communication interface 230 for connecting to the communication network 150. The messaging server 200 also includes one or more processors collectively represented as a processing unit 210, memory 250, and an optional display interface 240, all interconnected along with the network interface 230 via a communication bus 220. The memory 250 generally comprises a random access memory ("RAM"), a read only memory ("ROM"), and a permanent mass storage device, such as a disk drive, flash device, or the like. The memory 250 stores program code for a number of applications, which includes executable instructions for sender's remorse routine 500, linkable emoji install routine 600 (see FIG. 6, discussed below), share emoji image routine 700 (see FIG. 7, discussed below), emoji messaging routine 800 (see e.g., FIG. 8, discussed below), and conditional linked content routine 900 (see FIG. 9, discussed below). The sender's remorse routine 500 allows a user, within a designated time period, to retract, delete, and or modify a previously sent message. In one embodiment, the remorse routine 500 generates an opt-out pop-up message that allows a previously sent message to be cancelled and/or modified within a limited time. In one embodiment, the allowed time corresponds to the delay while the message is being sent via the message server to the recipient device. In one embodiment, during the send process, the emoji image is checked against a registered database of images. If a matching image is found, but the emoji content link does not match the saved link, a substitute link is suggested to the user. Other embodiments optionally allow for message validation, texting spellcheck, and other message modifications to occur after the message is sent by the sending client device, but prior to the message being delivered to the recipient client device. As may be expected, client devices may deploy multiple messaging routines on the same device. Each of these messaging applications may handle linkable emoji differently. For example, in one embodiment, the linkable emoji includes a link to content that is stored remotely from the receiving client device. While another embodiment sends the actual content with the emoji message so it is immediately available. As shown in FIG. 2, the emoji datastore 300 includes an emoji image datastore connected to a content link datastore. In one embodiment, emoji datastore 300 also includes linked content. Accordingly, each emoji stored in the datastore is linkable to content. In one embodiment, the emoji datastore 300 is distributed within the environment 100 (see FIG. 3, discussed below). In addition, the memory 250 also stores an operating system 255. These software components may be loaded from a computer readable storage medium 295 into memory 250 of the messaging server 200 using a read mechanism (not shown) associated with a non-transient computer readable storage medium 295, such as a floppy disc, tape, DVD/CD-ROM drive, memory card, or the like. In some embodiments, software components may also be loaded via the network communication interface 230, rather than via a computer readable storage medium 295. In some embodiments, the messaging server 200 may include many more components than those shown in FIG. 2. However, it is not necessary that all of these generally conventional components be shown in order to disclose an illustrative embodiment.

Although a particular messaging server 200 has been described that generally conforms to conventional general purpose computing devices, the messaging server 200 may be any of a great number of network devices capable of communicating with the communications network 150 and obtaining applications, for example, mainframes, minicomputers, workstations, personal computers, or any other suitable computing device. In some embodiments, some or all of the systems and methods disclosed herein may also be applicable to distributed network devices, such as cloud computing, and the like. Available cloud resources may include applications, processing units, databases, and file services. In this manner, the messaging server 200 enables convenient, on-demand network access to a shared pool of configurable linkable emoji share, search, promotion, recommendation, spoliation, install, storage and messaging related computing services and resources (e.g., networks, servers, storage, applications, and services) that can be rapidly provisioned and released with minimal management effort or service provider interaction. These services may be configured so that any computer connected to the communications network 150 is potentially connected to the group of linkable emoji applications, processing units, databases, and files or at the very least is able to submit emoji search requests, linkable emoji message selections, and/or linked content designation. In this manner, the data maintained by messaging server 200 and/or emoji datastore 300 may be accessible in a variety of ways by various client messaging devices 105 and client devices 400, for example, a digital tablet, a personal computer, a portable scanner, a handheld computer, a cell phone, or any other device that is capable of accessing the communication network 150.

Referring now to FIGS. 3A-3D, several components of a distributed datastore 300 are shown in accordance with at least one embodiment. More specifically, FIG. 3A includes one portion of the distributed datastore 300 providing an emoji datastore 300A. In one embodiment, the emoji datastore 300A is managed and maintained by the messaging server 200. The emoji datastore 300A includes portions dedicated to a library database of emoji images 305A, a library database of emoji text pattern links 310, library databases of content 390A and related links 315A, emoji identification information 320, a cross-linked database of emoji categories 325, and a cross-linked database of emoji attributes 330.

Figure 3A:
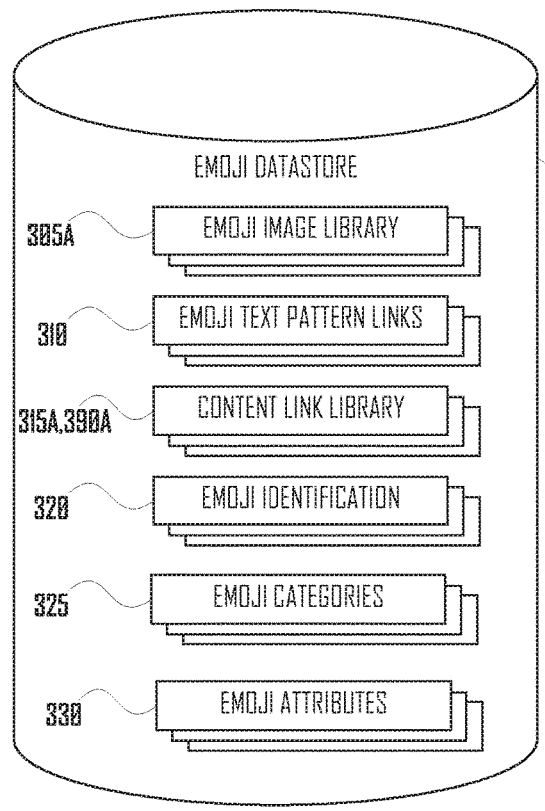
FIGS. 3A-3D illustrate several components of a distributed datastore in accordance with at least one embodiment.
Figure 3C:
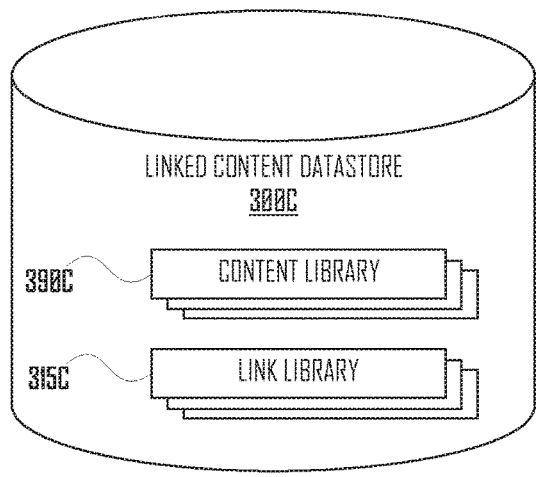
Figure 3B:
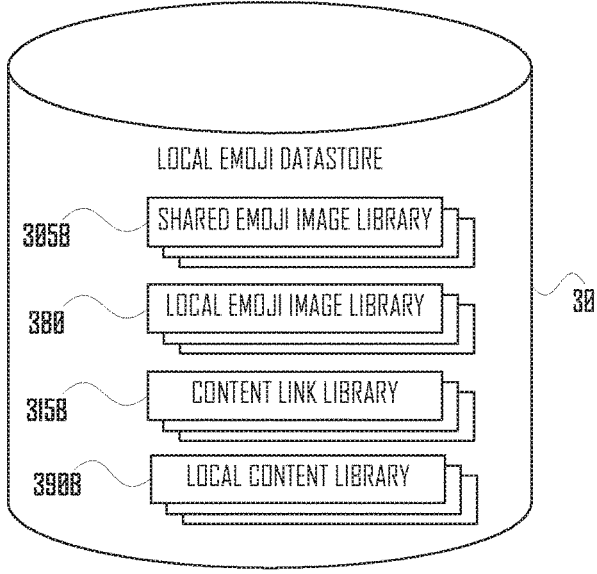

FIG. 3B includes one portion of the distributed datastore 300 providing a local emoji datastore 300B. In one embodiment, the local emoji datastore 300B is managed and maintained by the client device 400. The emoji datastore 300B includes portions dedicated to a library database of shared emoji images 305B, a library database of local emoji images 380, a library database of content links 315B, and a cross-linked library database of local content 390B. In one embodiment, the client device 400 may identify and/or create new emoji and subsequently link the emoji to content. Upon authorization of the user and approval of the messaging administrators, one embodiment allows the local linkable emoji to be uploaded to the emoji datastore 300A for general distribution. Moreover, in one embodiment, the shared image library 305B and content link library 315B on the user device 400 may be periodically updated by the messaging server 200.

FIG. 3C includes one portion of the distributed datastore 300 providing a linked content datastore 300C. In one embodiment, the linked content datastore 300C is managed and maintained by the content server 115. The linked content datastore 300C includes portions dedicated to a library database of content 390B and a library database of content links 315C.

Figure 3D:
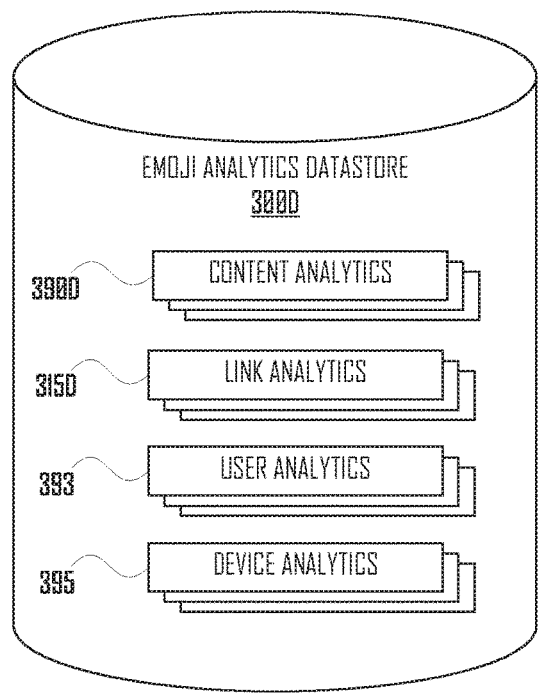

FIG. 3D includes one portion of the distributed datastore 300 providing an emoji analytics datastore 300D. In one embodiment, the emoji analytics datastore 300D is managed and maintained by the messaging server 200. In yet another embodiment, the emoji analytics datastore 300D is distributed across the messaging server 200, the client devices (105,400), and the content server 115. The emoji analytics datastore 300D includes portions dedicated to a database of content analytics 390D, a database of link analytics 315D, user analytics 393, and device analytics 395. For example, the emoji analytics datastore 300D may aggregate various social metrics among other collected analytic information, such as click counts, share counts, user preference counts, visit durations, user locations, gender, age, origination/destination message and device information, and other similar social data that may be obtained from data aggregated from various combinations of client devices, social network servers, messaging servers, and content servers. These analytics may be used to demonstrated click-through rates and vitality of various linkable emoji that are associated with commercial content. Accordingly, this information may indicate desirable timing to update the link associated with a particular emoji to point to different content. The emoji analytics datastore 300D includes portions dedicated to identifying emoji and content interdependencies according to image search target results, social metrics, emoji attributes, emoji source information, spoliation parameters and other categories that help define existing interdependencies between particular content that can be observed, collected, or documented relative to a set of emoji images.

Referring now to FIG. 4, several components of a messaging client device 400 in accordance with one embodiment. As shown in FIG. 4, the client device 400 includes a network communication interface 430 for connecting to the communication network 150. The client device 400 also includes one or more processors collectively represented as a processing unit 410 interconnected via a communication bus 420 with memory 450, optional touchscreen display interface 440, optional keyboard 460, and the network interface 430. The memory 450 often includes some combination of random access memory ("RAM"), read only memory ("ROM"), and a permanent mass storage device, such as a disk drive, flash device, or the like. The memory 450 stores program code for a number of applications, which includes executable instructions for emoji messaging routine 1000 (see FIG. 10, discussed below), local emoji creation routine 1100 (see FIG. 11, discussed below), local linkable emoji distribution routine 1200 (see FIG. 12, discussed below), and local content routine 1300 (see FIG. 13, discussed below). In addition, the memory 450 also stores an operating system 455, which includes a native keyboard and/or touchscreen keypad driver 465A. As shown in FIG. 4, the local datastore 470 includes portions dedicated to a shared emoji image datastore 405, a local emoji image datastore 480, and local content datastore 490. Each portion of the local datastore 470 connected to a content link datastore 415, which may include both local links and shared global links to content associated with each emoji. Accordingly, each emoji, shared or local, that is stored in the datastore is linkable via the content link datastore 415 to content. These software components may be loaded from a computer readable storage medium 495 into memory 450 of the client device 400 using a read mechanism (not shown) associated with a non-transient computer readable storage medium 495, such as a floppy disc, tape, DVD/CD-ROM drive, memory card, I/O port, or the like. In some embodiments, software components may also be loaded via the network communication interface 430, rather than via a computer readable storage medium 495. In some embodiments, the client device 400 may include many more components than those shown in FIG. 4. However, it is not necessary that all of these generally conventional components be shown in order to disclose an illustrative embodiment.

Figure 19:
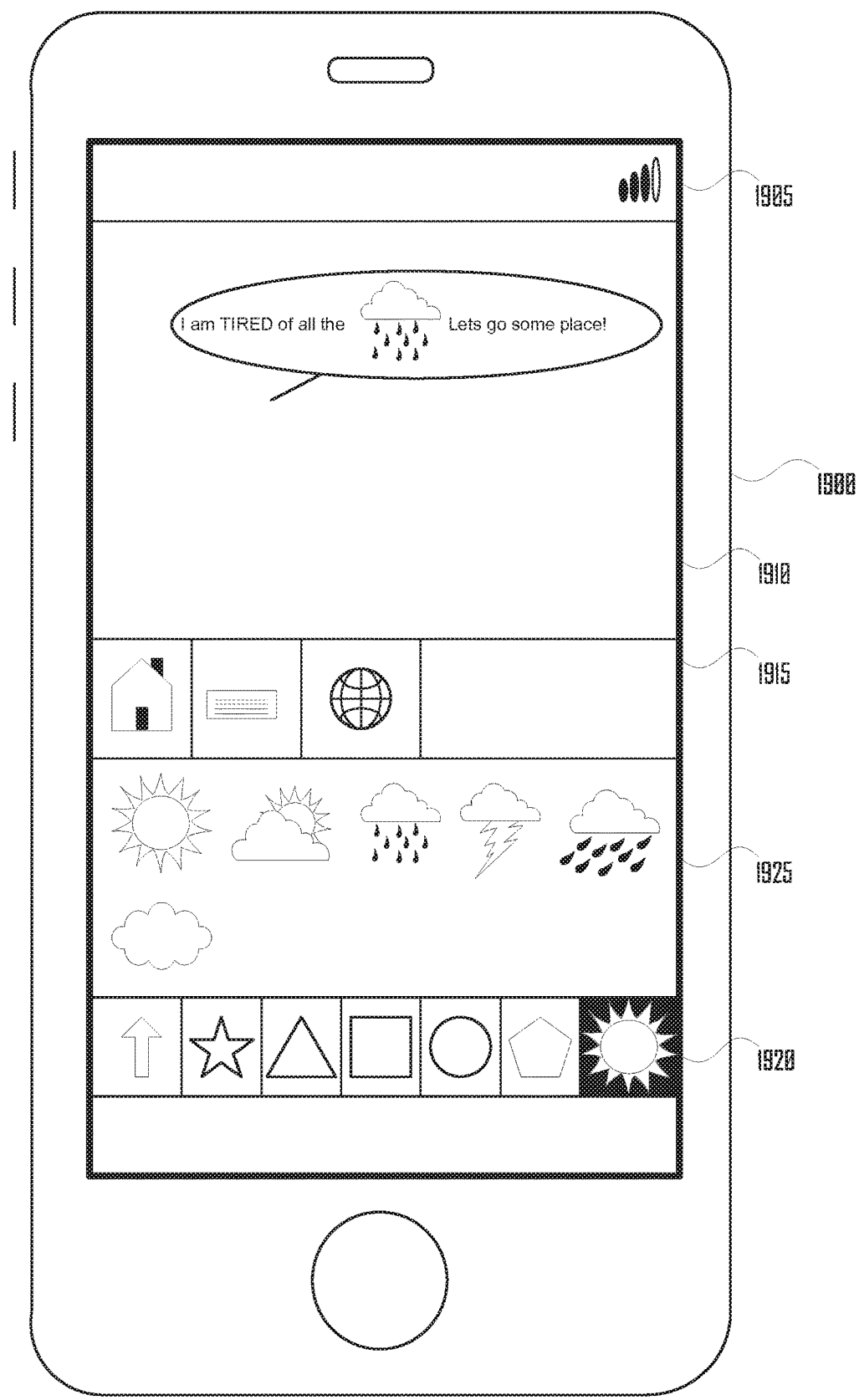
FIG. 19 illustrates a screenshot of a mobile messaging device with a library of related linkable weather emoji accessed to prepare a real-time message with an embedded linkable emoji in accordance with one embodiment.

In one embodiment, the client device 400 optionally includes a linkable emoji messaging application keyboard and/or keypad driver 465B to supplement and/or replace the native keyboard and/or touchscreen keypad driver 465A of the operating system 455. For example, some operating systems strictly control access to the keyboard driver, effectively preventing addition of new keys or libraries to any native digital keyboard. In these cases, linkable emoji functionality may still be achieved on the target device via a supplemental messaging application keyboard and/or keypad driver 465B to the native digital keyboard driver 465A of the device. Depending on the operating system 455, the linkable emoji messaging application keyboard driver 465B may be maintained as a universal standalone driver or only become active when designated applications are running on the client device. Various embodiments of the linkable emoji digital keyboard are shown in greater detail in FIGS. 19-21. In particular, FIG. 19 shows a screenshot of a mobile messaging device 1900 with a status bar 1905, a communication panel 1910, and a digital keyboard. The digital keyboard includes an application taskbar 1915, a collection library bar 1920 of related groups of linkable emoji, and a selection panel 1925. Above the collection library bar 1920 is the selection panel 1925 of available linkable emoji. As the weather collection is designated in the collection library bar 1920, available linkable emoji for weather conditions are shown. The collection library bar 1920 and selection panel 1925 may both be accessed to prepare a real-time message shown in communication panel 1910. Accordingly, a message with an embedded linkable emoji is shown in accordance with one embodiment. Depending on the parameters of the linkable emoji, the message might send an interested user to related weather forecast content, related weather news content, appropriate weather gear/clothing content, and other similar weather content. Alternatively, the user may designate custom content to better express their feelings to the recipient. Moreover, the user may also decide to designate various spoliation parameters including a weather dependent expiration if weather conditions change. This may be particularly useful if the proposed activity is weather dependent.

Figure 20:
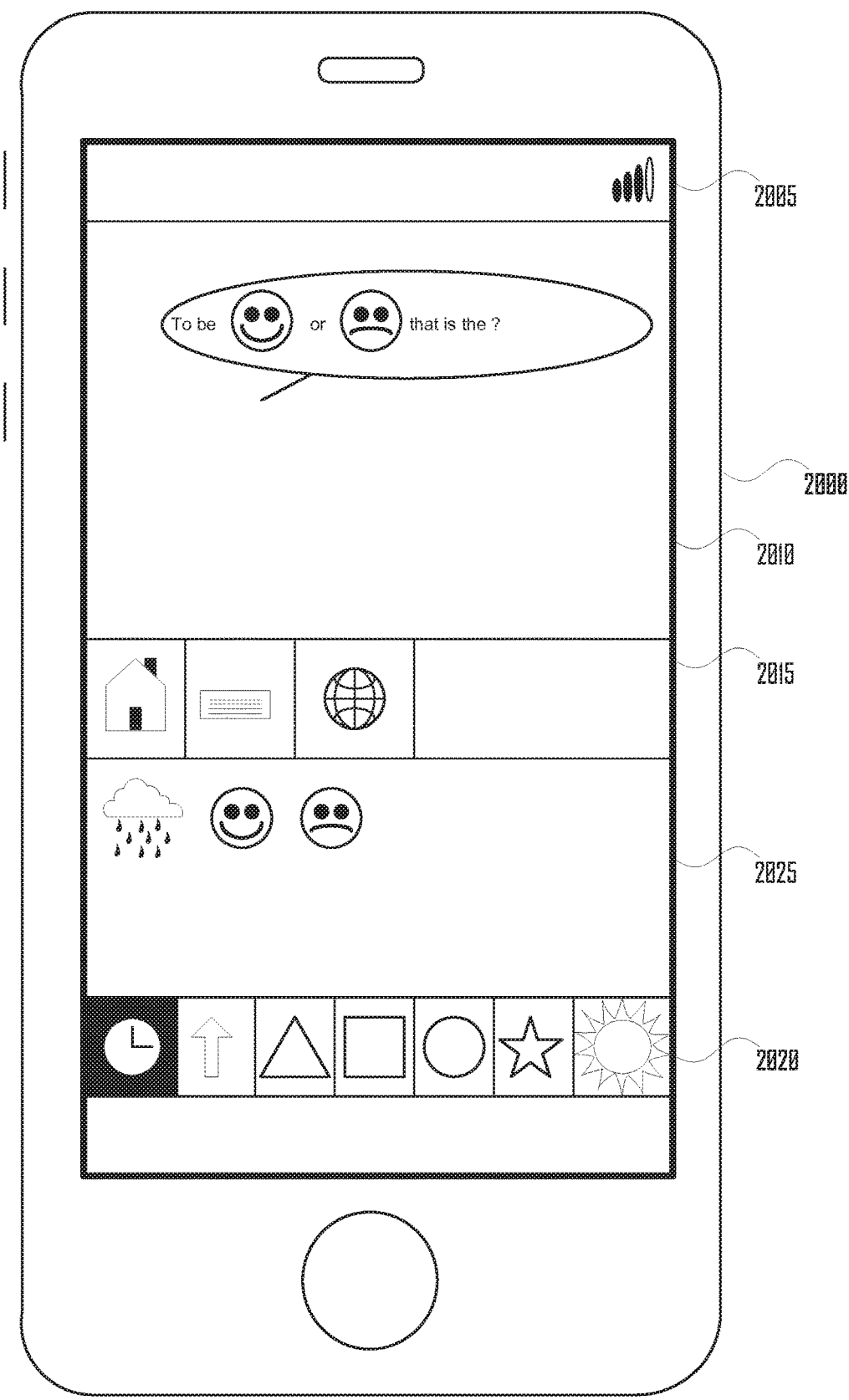
FIG. 20 a screenshot of a mobile messaging device with a library of recently used linkable emoji accessed to prepare a real-time message with multiple embedded linkable emoji in accordance with one embodiment.

Referring now to FIG. 20, a screenshot of a mobile messaging device 2000 shows a status bar 2005, a communication panel 2010, and a digital keyboard that includes an application taskbar 2015, a collection library bar 2020, and a selection panel 2025. The collection library bar 2020 designates recently used linkable emoji, which are shown in the selection panel 2025. In accordance with one embodiment, a real-time message with multiple embedded linkable emoji is shown in communication panel 2010.

Referring now to FIG. 21, side by side screenshots show a sender mobile messaging device 2105 and a recipient mobile messaging device 2110 exchanging real-time messages with embedded linkable emoji in accordance with one embodiment. The sender mobile messaging device 2105 shows a communication panel with a chronological history of communications and a category search field 2115A. The category search field 2115A designates "RESTAURANT EMOJI" and three linkable emoji options (Linkable Emoji-A, Linkable Emoji-B, and Linkable Emoji-C) are suggested for addition to the message. These restaurant choices may be a result of user activity, geographic proximity, ratings, sponsorship, or other categorical search metric. Moreover, the additional search results may be accessed using traditional touchscreen browsing tools, such as result scrolling (up/down) and swipe rotation (left/right). If a suitable linkable emoji is not found, the user may also add a new emoji with the add button 2120. The recipient mobile messaging device 2110 also shows a communication panel with a chronological history of communications, but uses a keyboard search field 2115B instead. The recipient designates "RESTAURANT Z" and a corresponding Linkable Emoji-Z is added as an alternative suggestion to the messaging conversation. If the search term was not found, one embodiment would request the user to add an emoji for the requested search target. Thus, if "Restaurant Z" was not available in the emoji datastore 300, the recipient user could create a new emoji by designating an image and a URL link to the restaurant. Even if a text search is used, a categorical response may be supplied. For example, if the recipient designates "cars" a series of logos for different automobile makers might be presented. Similarly, music may result in a list of artists, bands, recordings, performances, and/or stores. In one embodiment, emoji are suggested to the user based on the context of the message. Another embodiment allows the user to designate what type of link is associated with a particular emoji image. For example, a user may prefer purchase links to information links.

Figure 5:
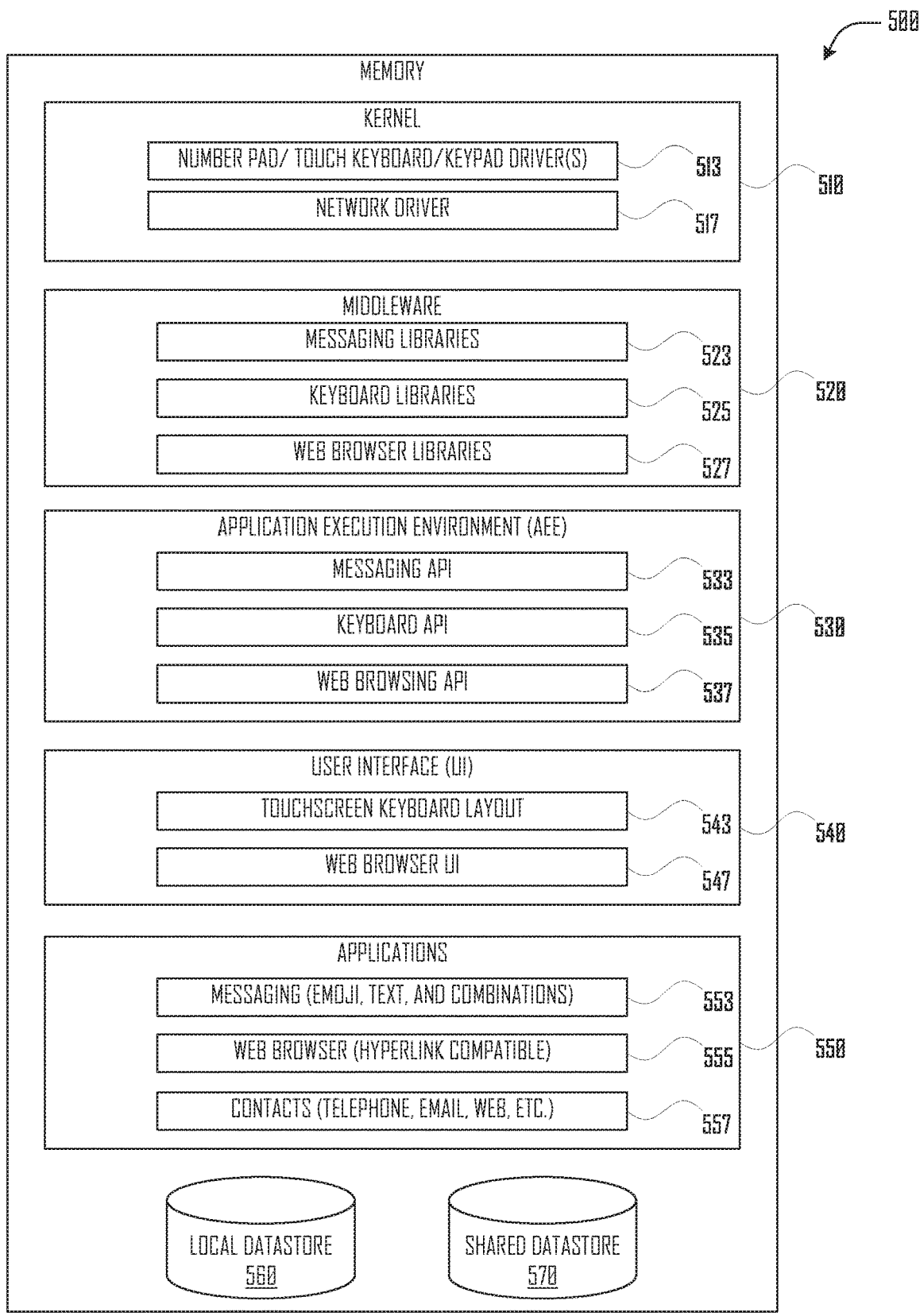
FIG. 5 illustrates several software components of a messaging client device shown in FIG. 4 in accordance with one embodiment.

Referring now to FIG. 5, several software components of a mobile messaging client device 500 are shown in accordance with one embodiment. The messaging client device 500 includes a kernel layer 510, a middleware layer 520, an application execution environment (AEE) layer 530, a user interface (UI) layer 540, applications 550, local datastore 560, and shared datastore 570. The kernel layer 510 provides management systems for processes and drivers for hardware on the mobile client device and may include number pad, touch screen keyboard, and keypad drivers 513 and a network driver 517 to connect to the network. The middleware layer 520 provides software libraries to applications running on the mobile client device and include messaging libraries 523, keyboard libraries 525, and web browser libraries 527. The AEE layer 530 provide application programming interfaces (API) to allow programs access to different components and software on the mobile client device and include a messaging API 533, a keyboard API 535, and a web browsing API 537. The user interface layer 540 provides the graphics and layouts seen on the display screen of the mobile client device and include touchscreen keyboard layouts 543 and web browser UI 547. The applications represent the programs that users of the mobile client device access and include messaging applications 553, web browsers 555, and contact applications 557. The messaging applications 553 may include instant messaging services, emoji compatible services, text-only services, and messaging applications offering a different combination of messaging services.

Figure 6:
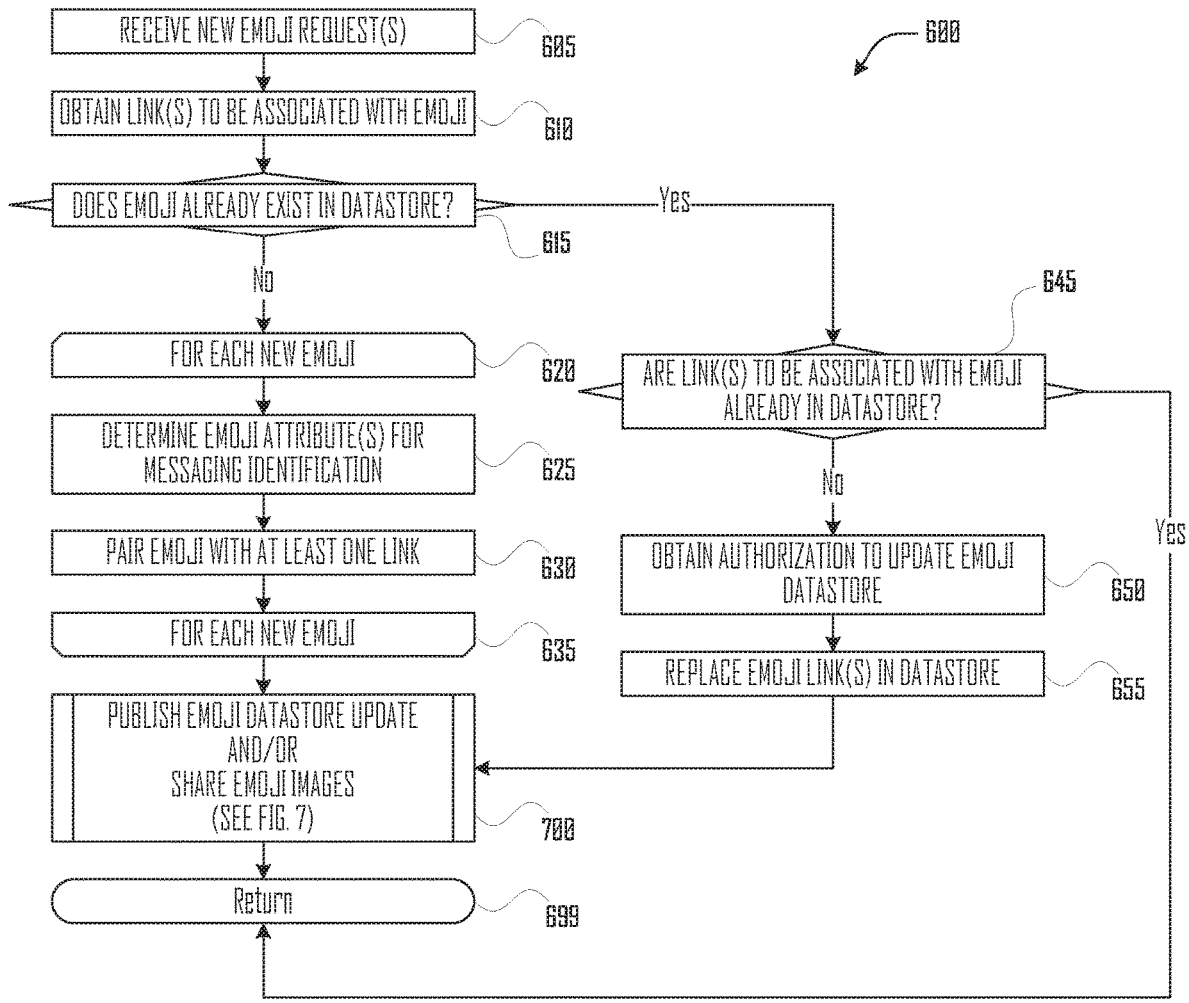
FIG. 6 illustrates a flow diagram of a linkable emoji install routine for the messaging server shown in FIG. 2 in accordance with one embodiment.

Referring now to FIG. 6, a flow diagram, in accordance with one embodiment, shows a linkable emoji install routine 600 for the messaging server 200 shown in FIG. 2. Once the messaging server 200 receives at least one request for a new linkable emoji, the linkable emoji install routine 600 begins in execution block 605. In one embodiment, a new emoji request includes an emoji image and optionally an emoji text pattern. The new emoji request may also include at least one link to associated content and/or the associated content. In execution block 610 the routine 600 obtains any remaining links to be associated with the emoji image and/or the emoji text pattern. This may include querying the messaging server or content server for the location of content. In query block 615, routine 600 determines whether the new emoji exists in the datastore. In one embodiment, routine 600 may query the datastore for the emoji image or emoji text pattern to determine whether it already exists. In yet another embodiment, the emoji link(s) are also queried.

If routine 600 determines that the new emoji does not already exist in the datastore, a new loop is started for each new emoji not found in the datastore in start loop block 620. For each new emoji, routine 600 determines emoji attributes for messaging identification in execution block 625. These emoji attributes may include emoji categories, image descriptions, text pattern, topical associations and descriptors, sponsorship affiliations, origination, distribution, spoliation parameters, and other attributes associated with the linkable emoji that may identify the emoji for insertion into a message. In execution block 630, the emoji image and/or text pattern are then paired with at least one link to additional content by routine 600. If another new emoji is still pending, then routine 600 starts a next loop at end loop block 635. Otherwise routine 600 submits the new linkable emoji for update publication in subroutine 700 (see FIG. 7, discussed below) and returns in termination block 699.

If routine 600 determines in query block 615 that the emoji already exists in the datastore, the routine 600 subsequently checks in query block 645 whether each of the link(s) associated with the new emoji are also in the datastore. If the same link(s) are found, routine 600 returns in termination block 699. Otherwise routine 600 obtains authorization in execution block 650 to update the links in the datastore that are currently associated with the existing linkable emoji with the new links. Upon authorization, routine 600 replaces the links in execution block 655 and submits the modified linkable emoji for update publication in subroutine 700 (see FIG. 7, discussed below) returns in termination block 699.

Figure 7:
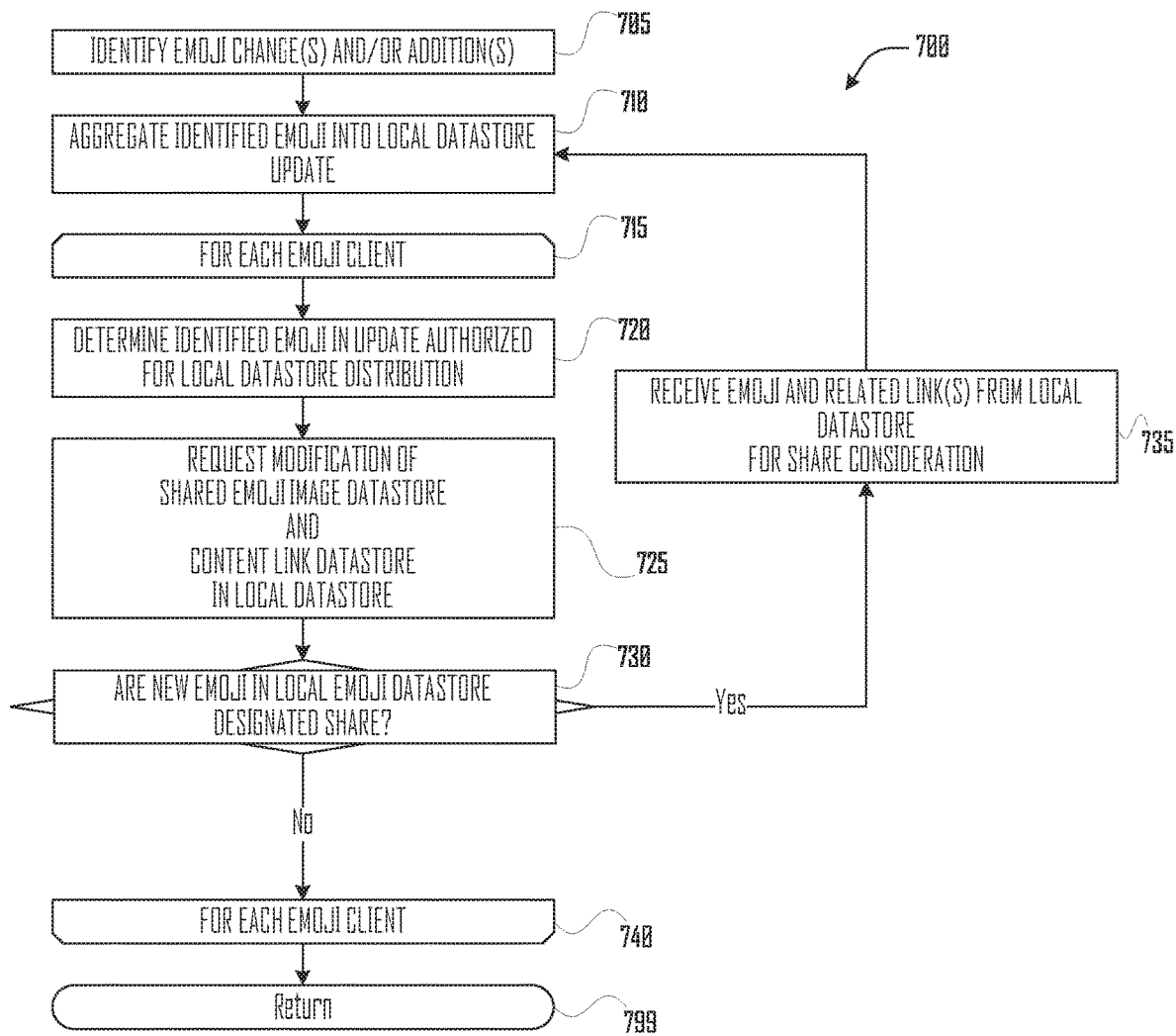
FIG. 7 illustrates a flow diagram of a publish/share emoji routine for the messaging server shown in FIG. 2 in accordance with one embodiment.

Referring now to FIG. 7, a flow diagram shows a publish/share emoji routine 700 for the messaging server 200 in accordance with one embodiment. The publish/share routine 700 identifies emoji changes and/or additions in execution block 705. In one embodiment, changes are provided an input parameter for a subroutine call. Alternatively, each new emoji or emoji modification may simply be added to an update table that is periodically reviewed and upon approval published into the main emoji datastore. Generally, a new emoji will first be submitted for administrative approval before being added to the emoji datastore. However, alternative methods, such as local creation, adoption, and sharing may also result in an emoji being considered for addition to the emoji datastore.

Once the changes and additions are identified, routine 700 aggregates the identified emoji into an update for the local client datastores in execution block 710. In one embodiment, the local datastore update is periodically transmitted from the messaging server to the client device. The local datastore update may also be requested by the client device from the messaging server. In one embodiment, the messaging server shares a notification that an update is available and the client device selectively determines when to obtain the update. This particular process is beneficial for mobile client devices that may have different data rates depending on which connection type is being used. Accordingly, one embodiment only provides updates when a designated data connection type is available.

In one embodiment, routine 700 starts a loop for each client at start loop block 715 to update local datastore. More specifically, routine 700 determines for each client which emoji in the local datastore update are authorized for local datastore distribution. In one embodiment, this may be determined based on client settings and emoji settings. For example, a client device might identify that it is a child/minor account and adult themed emoji are restricted from download. Moreover, an emoji may have a geographic limitation that limits the potential client devices to those registered within a particular geographic area. The geographic data might be collected from a variety of sources including device area code information, recent logged GPS data, and other client device or user data. Other spoliation factors may be considered with respect to emoji similar to those spoliation factors used in messages (see e.g., FIG. 14 below). Once the portions of the local datastore update available to the client have been identified, routine 700 requests modification in execution block 725 of the shared emoji image datastore and content link datastore in the local datastore of the client device. In one embodiment, a user may designate automatic update on a user device. Additionally, in one embodiment, the messaging server may mandate a required update that potentially overrides user designations to the contrary on a client device. This allows the system to remove illegal emoji images and regulate the shared database to ensure compatibility with other client devices in the system. While interacting with the client device, routine 700 determines in query block 730 whether any new emoji in the local datastore of the client device are designated to be shared. If new emoji exist on the local datastore of the client device, routine 700 uploads the designated emoji for consideration to be shared/added to the emoji datastore in execution block 735. If the new emoji from the client device may be shared, routine 700 aggregates the new emoji in execution block 710 into the next local datastore update. In one embodiment, an update from a first client device may be shared and uploaded to the messaging server, prior to the update being sent to a second client device. If no new emoji are found in the local datastore on the client device, routine 700 moves to the next client device in end loop block 740. If there are no more client devices that require updates, routine 700 ends and returns in termination block 799.

Figure 8:
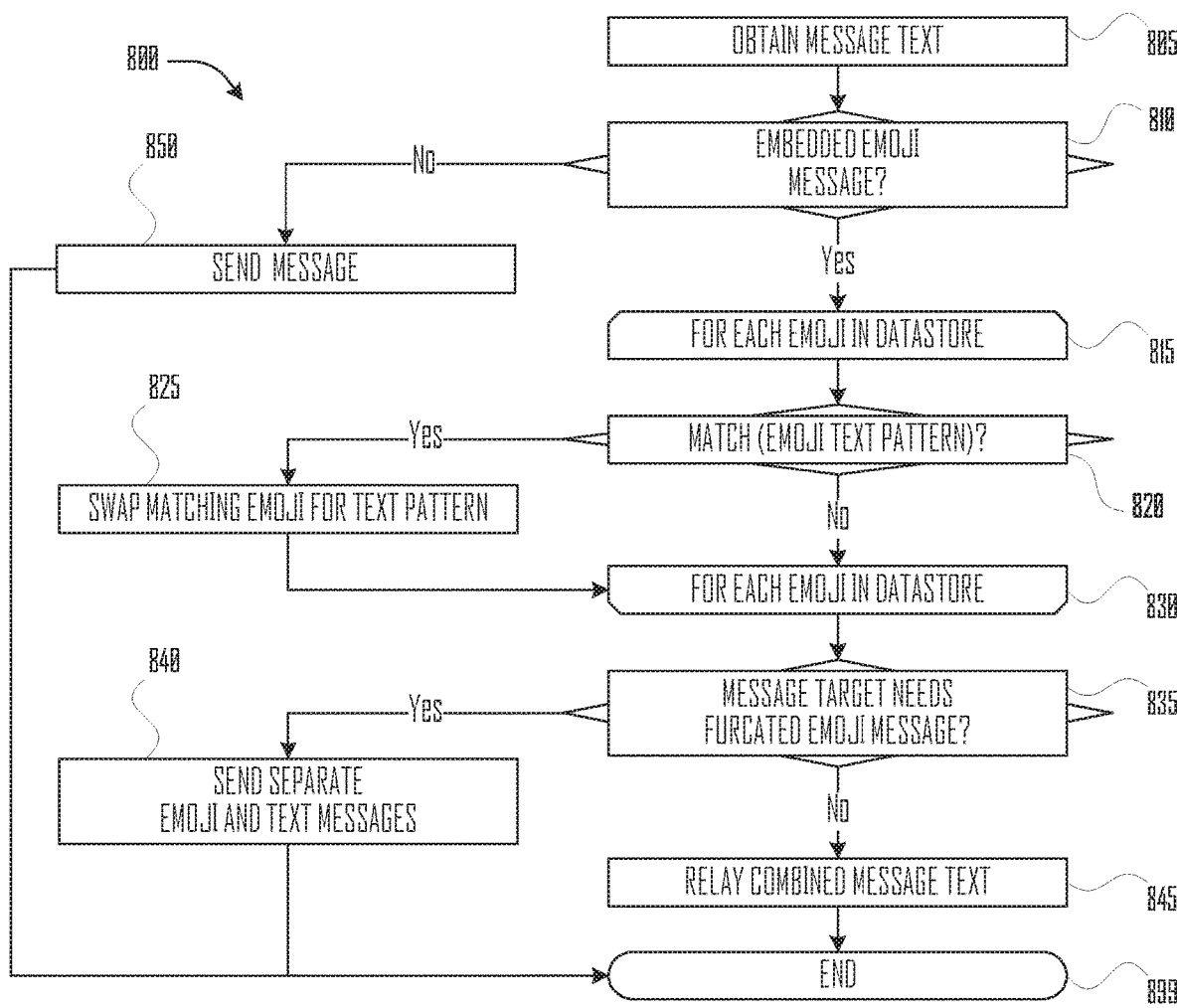
FIG. 8 illustrates a flow diagram of an embedded emoji message routine for the messaging server shown in FIG. 2 in accordance with one embodiment.

Referring now to FIG. 8, a flow diagram shows an embedded emoji message routine 800 for the messaging server 200 in accordance with one embodiment. Routine 800 obtains a message including message text in execution block 805. The message may optionally include an embedded emoji message and/or designate that an embedded emoji should be added to the message. In query block 810, routine 800 determines whether the message is an embedded emoji message. If the message is not an embedded emoji message, then the message is sent in execution block 850 and the routine 900 ends in termination block 899.

When an embedded message is sent, routine 800 begins a recursion in start loop block 815 to check the message against each emoji in the datastore. In query block 820, routine 800 checks for a match between characters in the message and the stored emoji text pattern. If a match is found, routine 800 swaps the matching emoji with the detected text pattern in execution block 825. In one embodiment, routine 800 inserts the identified emoji into the message. One embodiment, parses a message after detection into text portions and emoji portions. Since in one embodiment there may still be more than one emoji in each message, routine 800 moves to the next emoji for detection in end loop block 830. If no match is found, routine 800 moves to the next emoji in end loop block 830. Once all of the emoji have been compared and the loop is complete, routine 800 determines in query block 835 whether the message target may only receive a furcated emoji message. In one embodiment, a furcated message separates text portions and emoji portions into separate messages and send them in execution block 840. In the case where multiple emoji are included in the message, the furcated message may include several text portions and several emoji portions. Each portion may be sent individually. Moreover, each portion may also be sent via different networks. For example, the text portion may use SMS, and the emoji may be sent using a cellular data connection or wireless (WiFi connection). If the target user device can receive linkable emoji, routine 800 relays the combine message text and emoji in execution block 845. Once the message has been sent, furcated or not, routine 800 ends in termination block 899.

Figure 9:
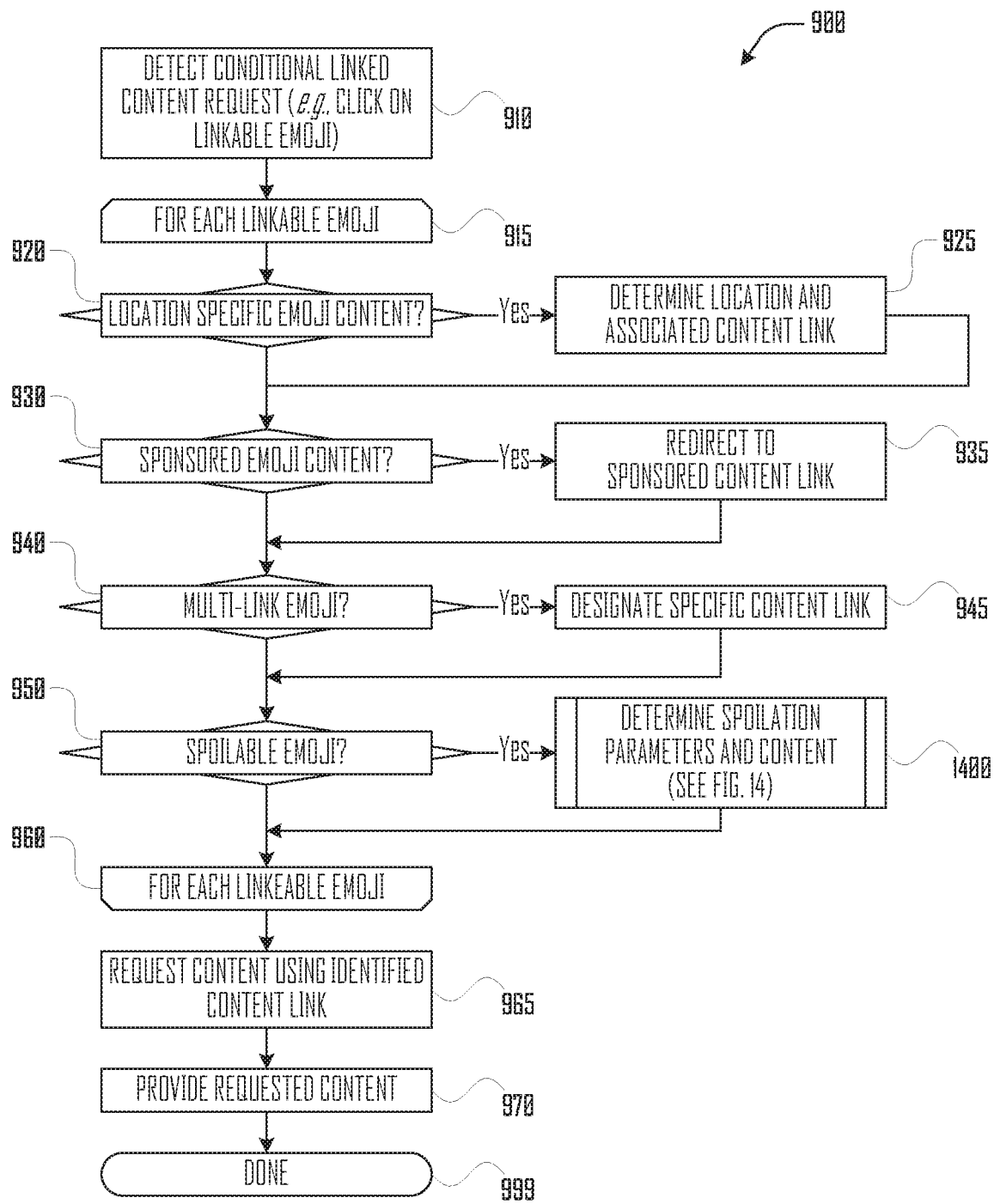
FIG. 9 illustrates a flow diagram of a conditional linked content routine for the messaging server shown in FIG. 2 in accordance with one embodiment.
Figure 25:
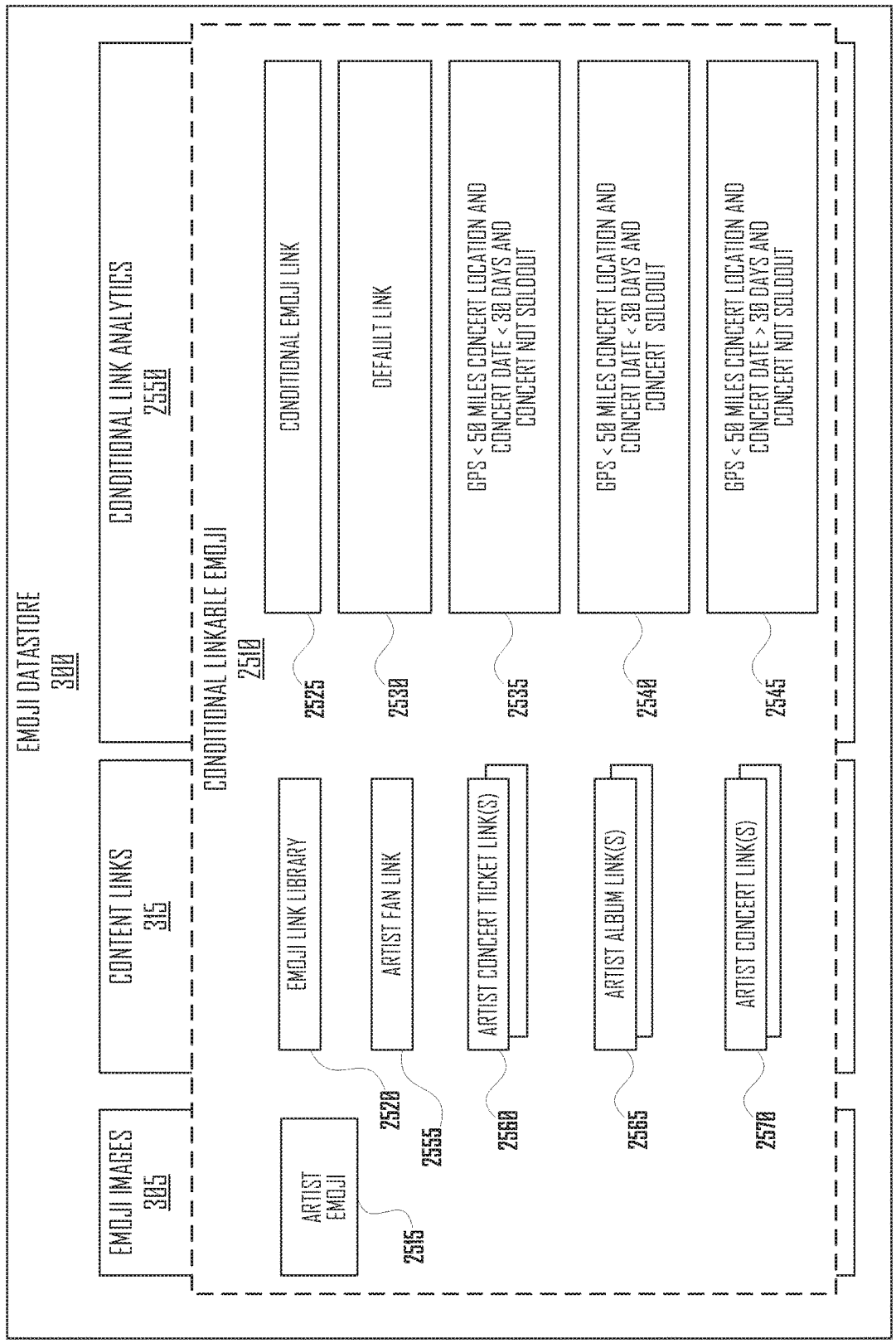
FIG. 25 illustrates several components of a conditional linkable emoji in an emoji datastore in accordance with at least one embodiment.

Referring now to FIG. 9, a flow diagram shows a conditional linked content routine 900 for the messaging server 200 in accordance with one embodiment. In one embodiment, a message may also include conditional content that may only be sent to the target if the designated conditions associated with the message or message components are satisfied. In execution block 910, routine 900 detects a conditional linked content request. For example, a target user may click on a linkable emoji sent in a message. Upon detection, routine 900 starts for each linkable emoji selected a loop in start loop block 915. In first step of the loop, routine 900 determines whether there is location specific emoji content 920 in query block 920. If location specific content is found, routine 900 determines the location of the requesting user and provides the associated content based on the location of the requesting user in execution block 925. Next in query block 930, routine 900 determines whether there is sponsored emoji content associated with the linkable emoji. If the selected linkable emoji is a sponsored emoji, routine 900 redirects to the sponsored content link in execution block 935. In query block 940, routine 900 determines whether the linkable emoji include a multi-link emoji. If a multi-link emoji is present, routine 900 determines which link should be designated in execution block 945. One embodiment of a conditional multi-link emoji is shown in FIG. 25. In query block 950, routine 900 determines whether the message includes spoilable emoji. If the emoji is spoilable, routine 900 determines spoliation parameters and content in subroutine 1400 (see e.g., FIG. 14 below). Upon completing the query of conditions associated with each linkable emoji, routine 900 ends the loop in end loop block 960. It should be understood by those of skill in the art that other conditions may be checked by routine 900 and still remain within the scope of this disclosure. Moreover, the order of evaluation by routine 900 need not be exactly as illustrated. Once routine 900 has finished the conditional loop, the identified content link is used to request the associated content in execution block 965. Upon receipt of the requested content, routine 900 provides the requested content in execution block 970.

Figure 10:
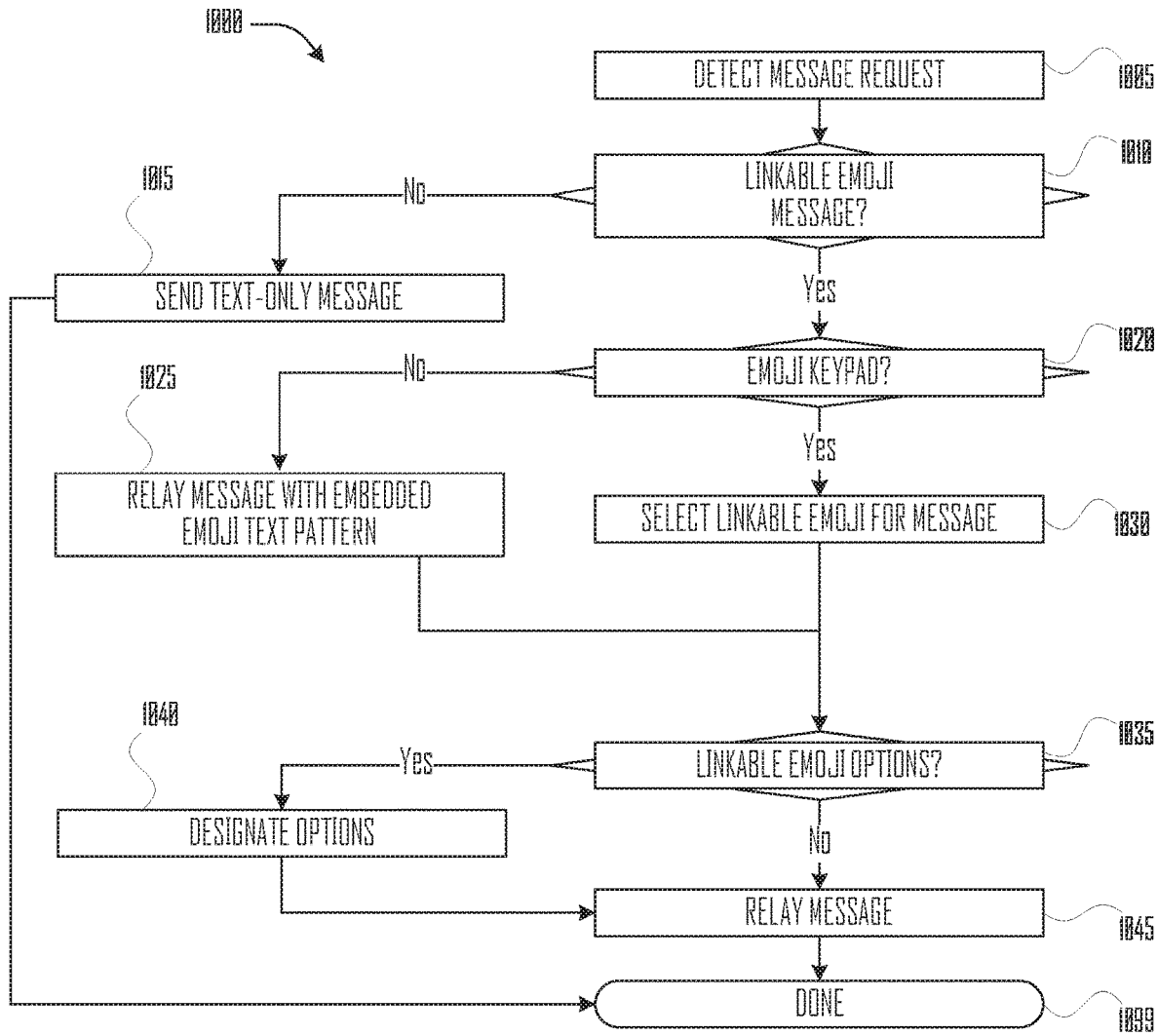
FIG. 10 illustrates a flow diagram of a linkable emoji message routine for the messaging client device shown in FIG. 4 in accordance with one embodiment.

Referring now to FIG. 10, a flow diagram, in accordance with one embodiment, shows a linkable emoji message routine 1000 for the messaging client device 400 shown in FIG. 4. In execution block 1005, routine 1000 starts upon detecting a message request. In query block 1010, routine 1000 determines whether the message will be a linkable emoji message. In one embodiment, this is based on whether a linkable emoji is added to the message. In yet another embodiment, the message text is scanned to see if an embedded emoji text pattern in present. If the message is not a linkable emoji message, routine 1000 sends the text-only message in execution block 1015. For messages with a linkable emoji routine 1000 determines in query block 1020 whether an emoji keypad or keyboard is available. As previously discussed, an emoji keypad/keyboard may be a component of the operating system, an application, or a combination of both. If no emoji keypad/keyboard is available, routine 1000 relays the message with an embedded emoji text pattern associated with the desired linkable emoji in execution block 1025. When available to routine 1000, the emoji keypad/keyboard is used to allow a user to select a linkable emoji for insertion into the message in execution block 1030. In query block 1035, routine 1000 determines whether there are any options and/or conditions associated with the linkable emoji in the message. If options need to be designated for a particular linkable emoji, routine 1000 obtains those designations in execution block 1040. Routine 1000 relays the message with the linkable emoji to the messaging server in execution block 1045. Upon sending/relaying the message, routine 1000 ends in termination block 1099.

Figure 11:
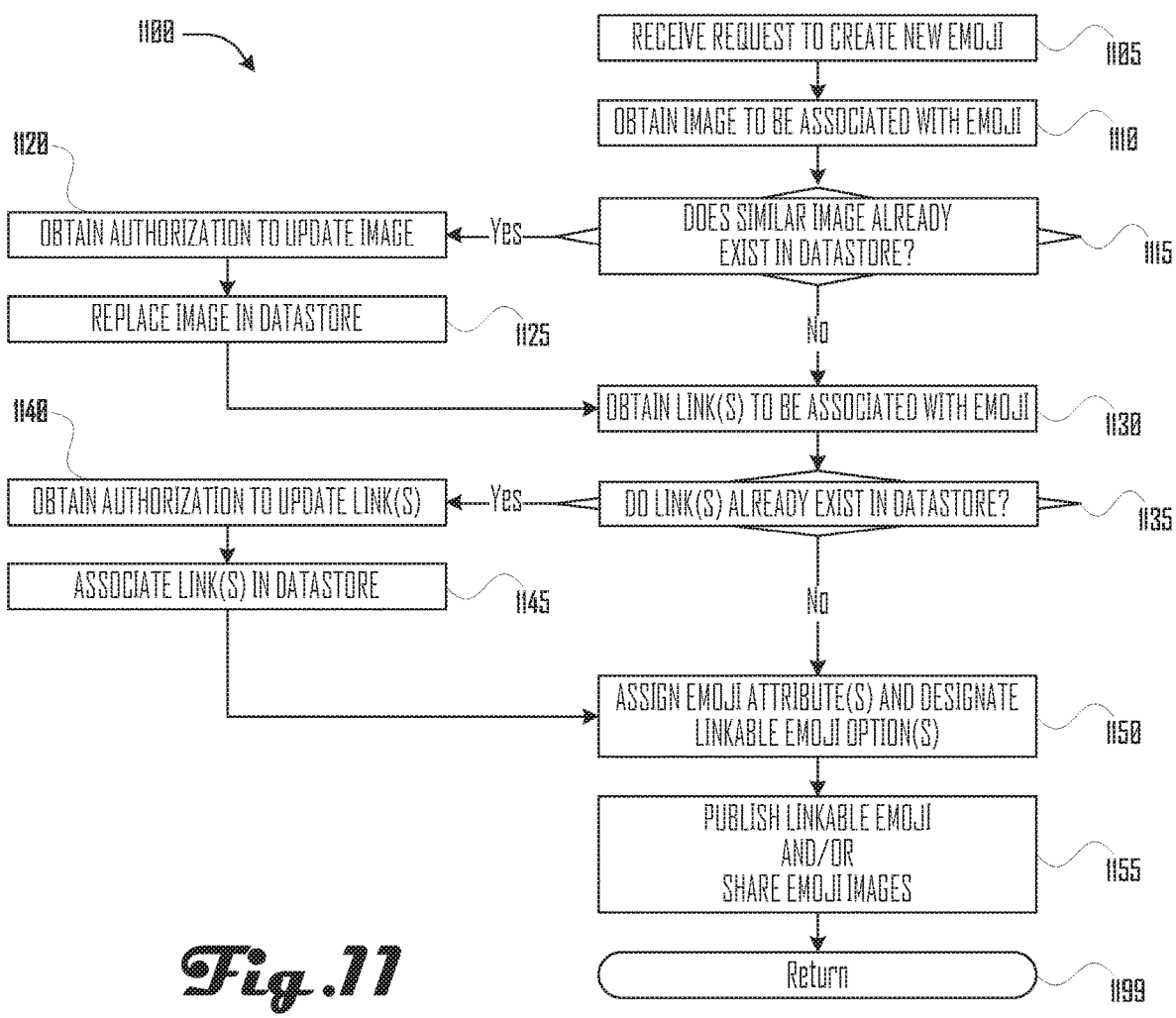
FIG. 11 illustrates a flow diagram of a local emoji creation routine for the messaging client device shown in FIG. 4 in accordance with one embodiment.

Referring now to FIG. 11, a flow diagram shows a local emoji creation routine 1100 for the messaging client device 400 in accordance with one embodiment. In execution block 1105, routine 1100 receives a request to create a new emoji on the client device. The routine 1100 obtains an image to be associated with the new emoji in execution block 1110. In query block 1115, routine 1100 checks to determine whether a similar image already exists in the datastore. In one embodiment, the relative similarity of an image is determined by image attributes including file information, such as name, image size, creation date, and file type. In one embodiment, the relative similarity of an image is based on a pixel by pixel comparison of each emoji, where each pixel receives a relative similarity score. Uniform similarity on a pixel by pixel basis may indicate that the images being compared are similar. As each of the emoji images are relatively small, the pixel by pixel is comparison may be done quickly. Alternatively, some embodiments evaluate the emoji image upon addition to the datastore, so only the new emoji need be evaluation. In one such embodiment, an emoji pixel map is created with a score based on the pixel evaluation, a search may then be conducted for emoji in the datastore that have scores within a desired similarity range. If a similar image is found, routine 1100 obtains authorization in execution block 1120 to update the image and replaces the image with the new image in execution block 1125. Depending on the embodiment, authorization to change the emoji may be obtained from an administrator of the datastore. In one embodiment, authorization may be obtained from a user for local emoji, as an administrator for portions of the local datastore, but a system administrator needs to approve changes to shared emoji. Next routine 1100 obtains at least one link to be associated with the new emoji in execution block 1130. The datastore is checked by routine 1100 in query block 1135 to determine whether the at least one link already exists in the datastore. If a similar link is found, authorization to redirect the link to the new image is requested in execution block 1140. Upon receiving authorization, routine 1100 associates the at least one link with the new emoji in the datastore in execution block 1145. In one embodiment, the same link may be associated with many different emoji, in which case associating/updating includes adding the new emoji to the list of related emoji in the datastore. Once the image and at least one link of the new linkable emoji are verified against the existing datastore, routine 1100 assigns attributes and designates options associated with the new linkable emoji in execution block 1150. In execution block 1155, routine 1100 publishes the linkable emoji to the local datastore and/or recommends that the linkable emoji be shared. In one embodiment, new emoji must be shared globally via the datastore associated with the messaging server before they can be universally included in a message. Thus, as shown previously, the new emoji may be sent from the client device to the messaging server for consideration and approval to be added to the local datastore update shared by the datastore with client devices (see e.g., FIG. 7 above). If approved the new emoji is included in an update Further, one embodiment shares a new emoji directly with target client device before transmitting a message including the new emoji. In this manner, the new emoji may be propagated from an originating client device to the local datastore of a target client device. In one embodiment, the target client device after receiving may optionally choose to add the new linkable emoji to the target local datastore for future use. After publication/sharing the new emoji, routine 1100 returns in termination block 1199.

Figure 12:
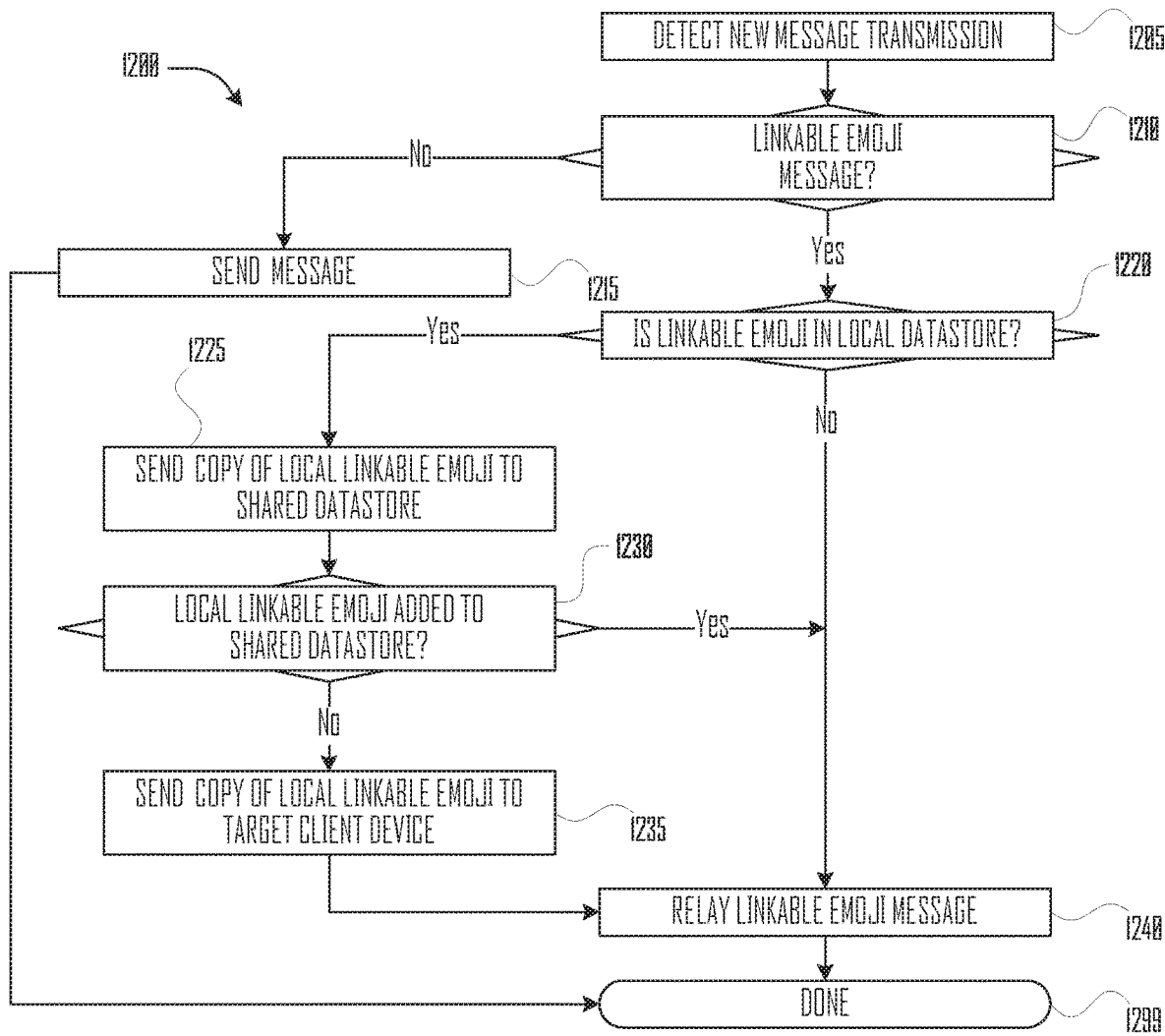
FIG. 12 illustrates a flow diagram of a local linkable emoji distribution routine for the messaging client device shown in FIG. 4 in accordance with one embodiment.

Referring now to FIG. 12, a flow diagram shows a local linkable emoji distribution routine 1200 for the messaging client device 400 in accordance with one embodiment. In execution block 1205, routine 1200 detects a new message transmission. In query block 1210, routine 1200 determines whether the message includes a linkable emoji. If no linkable emoji is included, routine 1200 sends the message in block 1205. Otherwise routine 1200, in query block 1220 determines whether the linkable emoji in the message is already in the local datastore. If not found in the local datastore, the linkable emoji originates from the shared datastore, which should be available to every client device so routine 1200 merely relays the linkable emoji message in execution block 1240. However, if the linkable emoji is in the local datastore, routine 1200 sends a copy of the local linkable emoji to the shared datastore in execution block 1225. As previously shown in FIG. 3, the shared datastore includes portions on the client device and messaging server. Accordingly, upon receiving a copy of the linkable emoji, an administrator may authorize addition of the linkable emoji to the shared datastore. In query block 1230, routine 1200 determines whether the local linkable emoji has been added to the shared datastore. In one embodiment, this process may include the determination of whether an equivalent or substitute linkable emoji exists in the shared datastore. Once the local linkable emoji is added to the shared datastore, a target client device will have access to associated links and content so that routine 1200 can relay the linkable emoji message in execution block 1240. If the local linkable emoji is not added to the shared datastore, routine 1200 sends a copy in execution block 1235 of the local linkable emoji to the target client device for use with the emoji message and then relays the linkable emoji message to the target client device in execution block 1240. Routine 1200 ends in termination block 1299, once the emoji message has been send and/or relayed.

Figure 13:
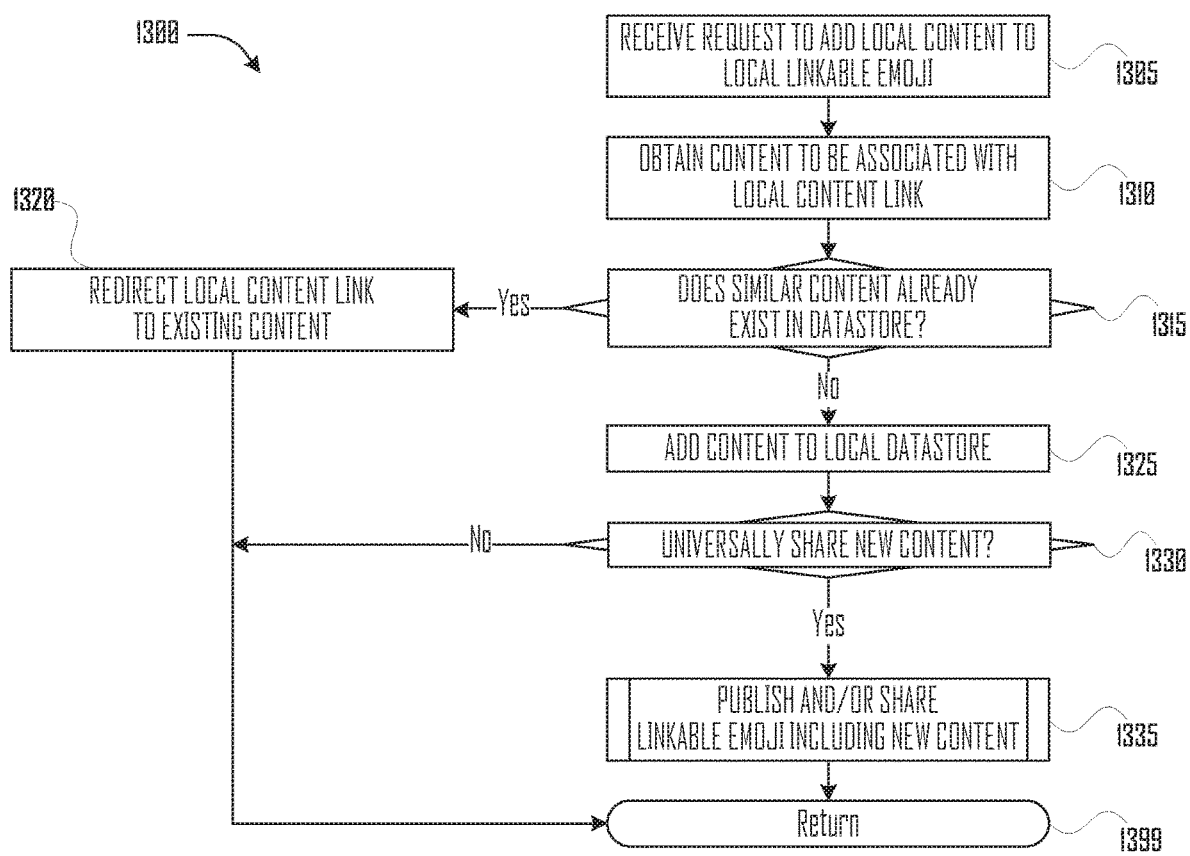
FIG. 13 illustrates a flow diagram of a local content routine for the messaging client device shown in FIG. 4 in accordance with one embodiment.

Referring now to FIG. 13, a flow diagram shows a local content routine 1300 for the messaging client device 400 in accordance with one embodiment. Routine 1300 responds to a request received in execution block 1305 to add local content to a local linkable emoji. In one embodiment, a user may have created content that they desire to be available when the target user clicks on the linkable emoji. The request may include the content, a link to the content, or redirect to a sponsor server that dynamically generates custom links for sponsored content. In execution block 1310, routine 1300 obtains the content to be associated with the local content link. In various embodiments content may be stored remotely for easier access by target client devices. Alternatively, content may be maintained locally. For example, when sensitive content, such as personal images or information, is involved a user may feel more comfortable maintaining the content locally to better control access. Once routine 1300 obtains the content, locally or remotely, query block 1315 determines whether similar content already exists in the datastore. If the content already exists in the datastore, routine 1300 redirects the local content link to the existing content in execution block 1320. Otherwise routine 1300 adds the content to the local datastore in execution block 1325. In query block 1330, routine 1300 determines whether to share the added content universally. If the new content is to be shared, routine 1300 publishes/shares the linkable emoji including the new content in subroutine 1335 and then ends in termination block 1399. Otherwise if the new content is to remain private, Routine 1300 ends and returns directly in termination block 1399.

Figure 14:
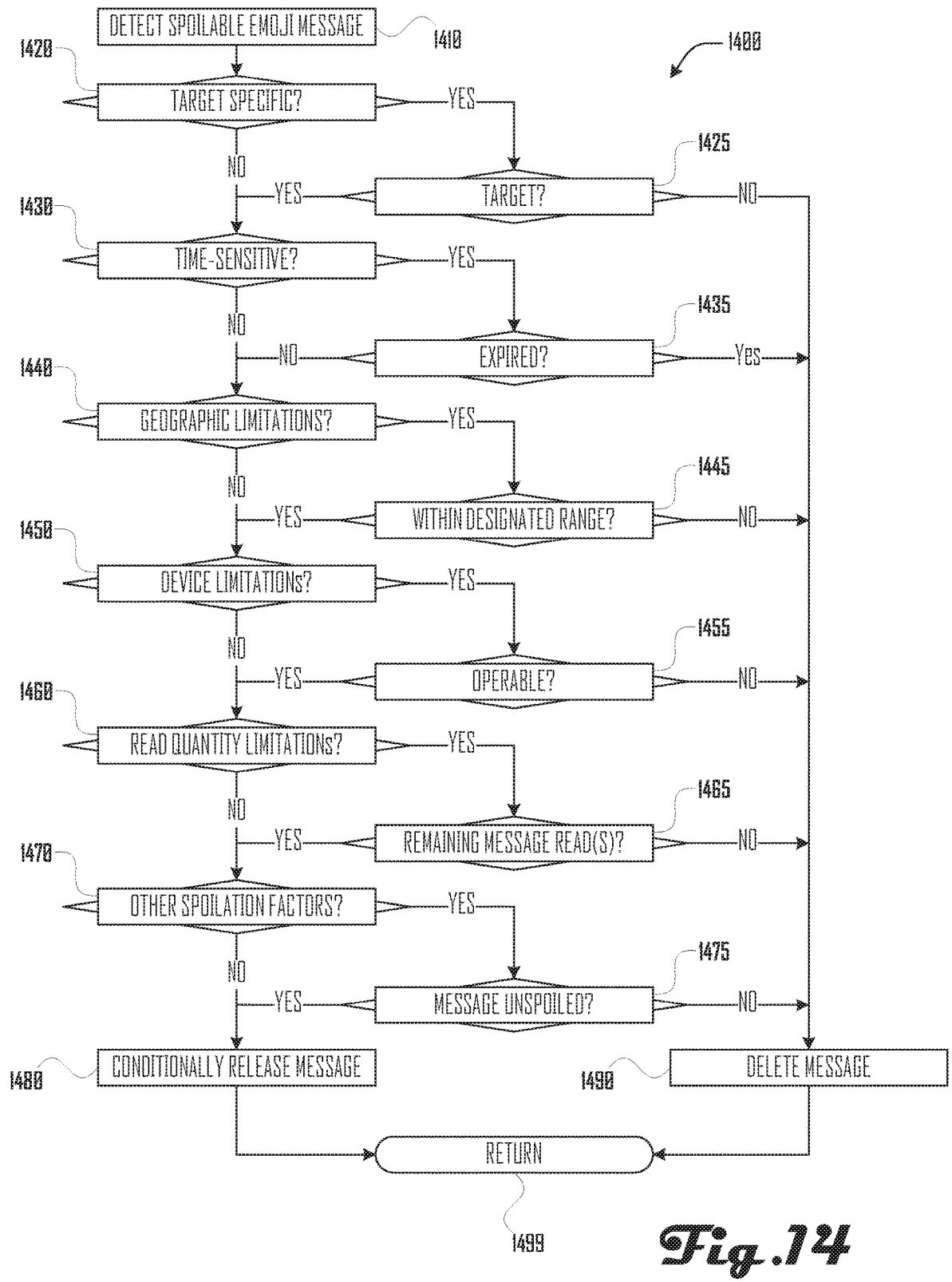
FIG. 14 illustrates a flow diagram of a spoliation subroutine in accordance with one embodiment of the conditional linked content routine shown in FIG. 9.

Referring now to FIG. 14, a flow diagram shows an example of a spoliation subroutine 1400 in accordance with one embodiment of the conditional linked content routine shown in FIG. 9. There are a variety of factors that can spoil a message and a whole variety of alternate and/or equivalent implementations, including order of execution that may be substituted for the specific embodiments shown and described in FIG. 9 without departing from the scope of the present disclosure for spoliation. Turning to the illustrated embodiment, routine 1400 detects a spoilable emoji message in execution block 1410.

In query block 1420, routine 1400 determines if the message is target specific. If the message is target specific, query block 1425 determines if the client device is associated with the target. If not, the message is spoiled and routine 1400 deletes the message in execution block 1490 without letting it be read and returns in termination block 1499.

In query block 1430, routine 1400 determines if the message is time-sensitive. If the message is time-sensitive, query block 1435 determines if the message is expired. If expired, the message is spoiled and routine 1400 deletes the message in execution block 1490 without letting it be read and returns in termination block 1499.

In query block 1440, routine 1400 determines if the message has geographic limitations. If the message is limited geographically, query block 1445 determines if the client device is within a designated range. If not, the message is spoiled and routine 1400 deletes the message in execution block 1490 without letting it be read and returns in termination block 1499.

In query block 1450, routine 1400 determines if the message has device limitations. If the message is device limited, query block 1455 determines if the client device is operable with the content and/or content. If not, the message is spoiled and routine 1400 deletes the message in execution block 1490 without letting it be read and returns in termination block 1499.

In query block 1460, routine 1400 determines if the message has read quantity limitations. For example, a sender may only want a message to be read once or twice before being deleted. Alternatively, a sender may only want the content associated with the message to be exposed once or twice before being removed. Accordingly, if the message is read quantity limited, query block 1465 determines how many message read(s) remain. If not, the message is spoiled and routine 1400 deletes the message in execution block 1490 without letting it be read and returns in termination block 1499.

In query block 1470, routine 1400 determines if the message is subject to other spoliation factors. A spoliation factor may include events, attributes, or circumstances which invalidate the message. These spoliation factors may be designated by the original sender, messaging server, sponsorship server, and/or target client device. If the message is subject to other spoliation factors, query block 1475 determines if the message is unspoiled. If unspoiled, routine 1400 conditionally releases the message in execution block 1480 and returns in termination block 1499. If spoiled, routine 1400 deletes the message in execution block 1490 and returns in termination block 1499.

Figure 15:
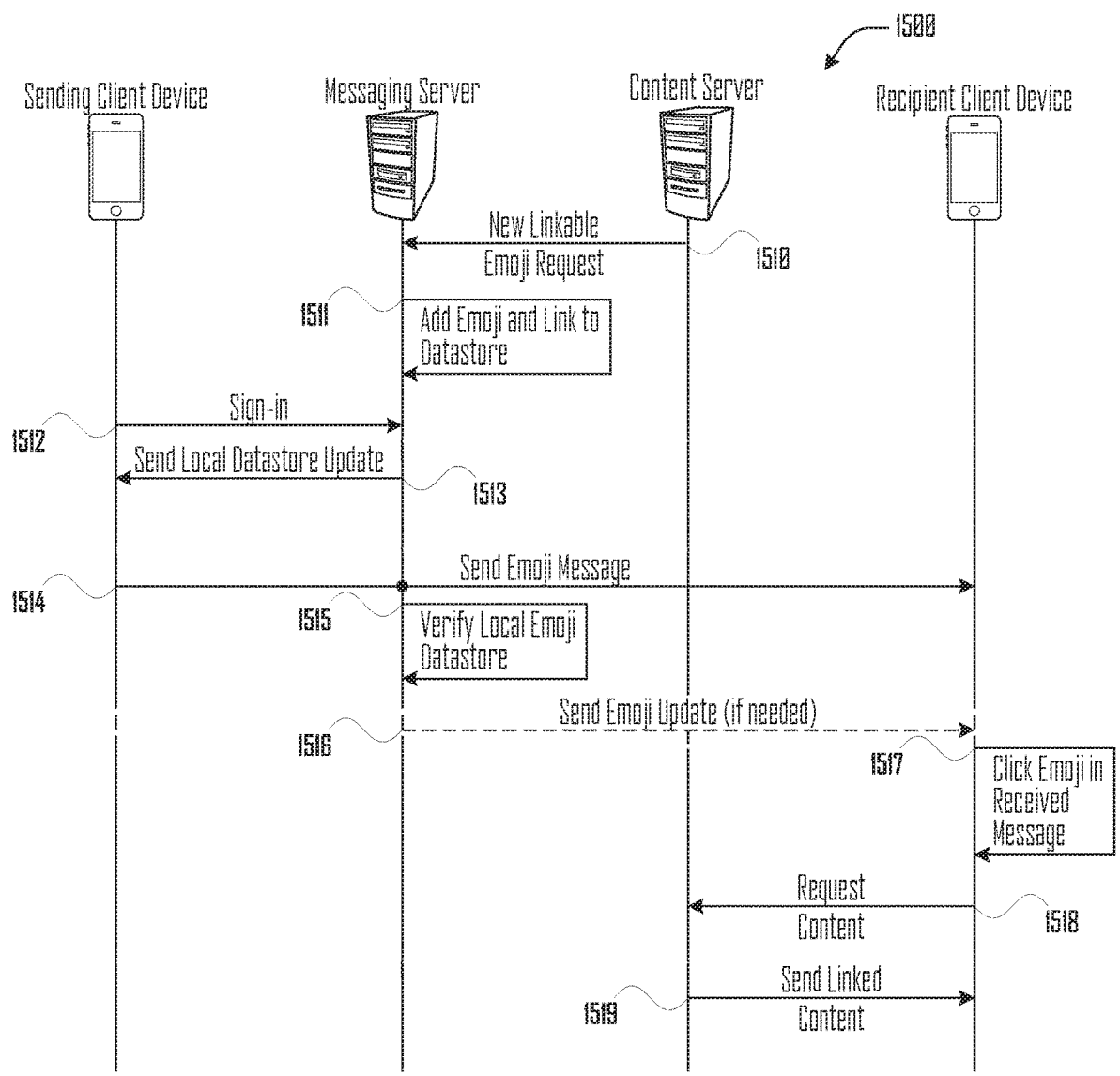
FIG. 15 illustrates a series of communications between various devices distributing a linkable emoji for use in a real-time message in accordance with one embodiment.

Referring now to FIG. 15, a sequence of communications 1500 between various devices are shown distributing a linkable emoji for use in a real-time message in accordance with one embodiment. The illustrated sequence of communications 1500 show one scenario in which a messaging server distributes a linkable emoji based on a new linkable emoji request 1510 received from a content server. The illustrated sequence of events is provided as an example for illustrative purposes. In other embodiments, a similar distribution process of linkable emoji may be obtained via a different sequence of events and/or operations.

Beginning the illustrated sequence of communications 1500, a content server requests a messaging server to generate a new linkable emoji. In one embodiment, the request may include an emoji image, emoji text pattern, and/or emoji link. For example, the request may include a linkable emoji 2410 (see e.g., FIG. 24 below) and/or a conditional linkable emoji 2510 (see e.g., FIG. 25 below). The messaging server adds 1511 the emoji image and link to the datastore. Subsequently, when a sending client device connects 1512 to the messaging server a local datastore update is sent to the sending client device 1513 that includes the newly added linkable emoji. Making the new linkable emoji available when the sending client device sends 1514 an emoji message to a recipient client device. Upon receiving the emoji message, messaging server verifies 1515 the local emoji datastore of the recipient client device and, if necessary, sends 1516 a local emoji datastore update to the recipient client device that includes the linkable emoji. Upon receiving the message, a user reading the emoji message clicks 1517 on the emoji embedded in the received message. The recipient client device requests 1518 the content associated with the linkable emoji from the content server. The content server sends 1519 the linked content to the requesting recipient device.

Figure 16:
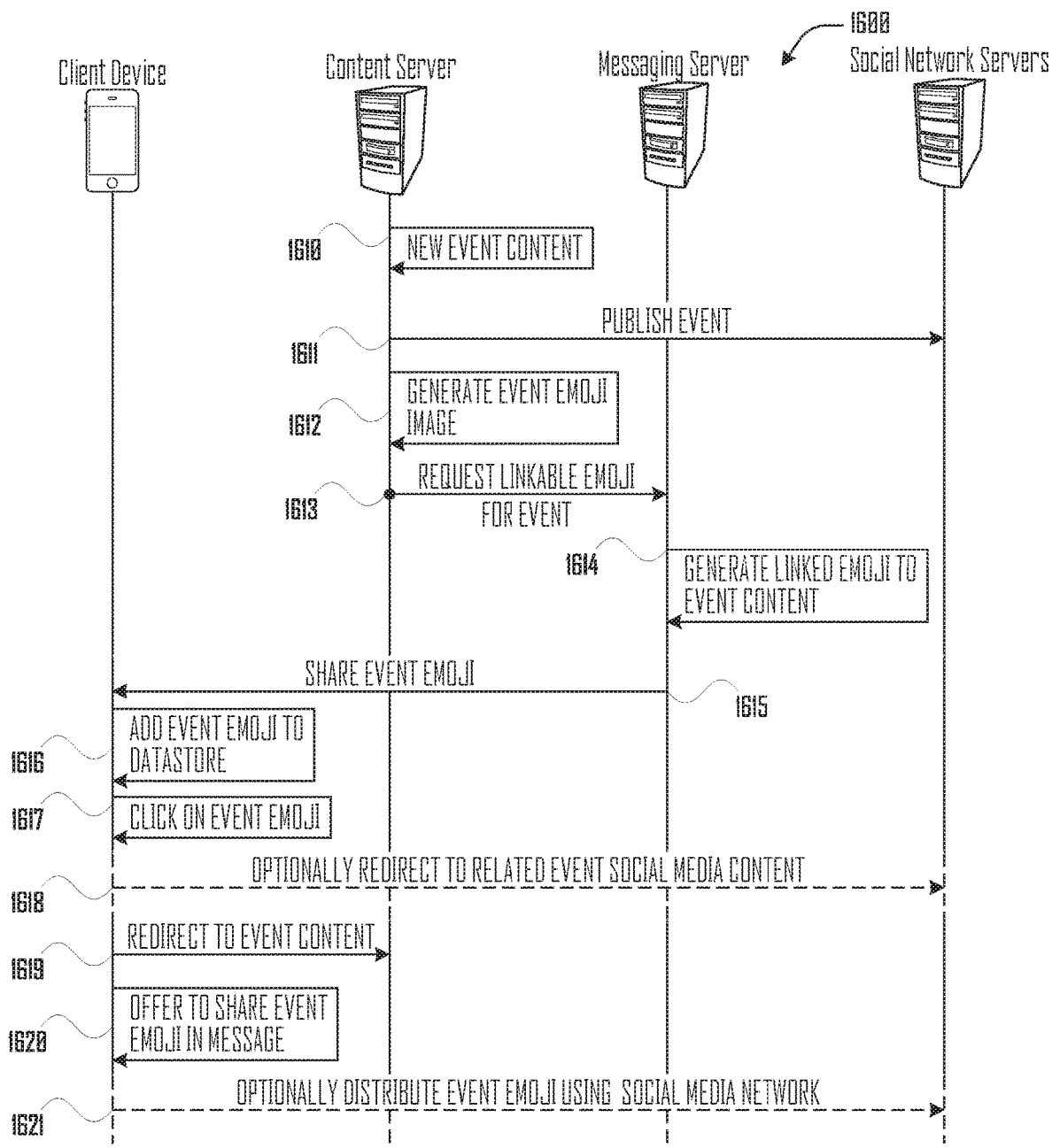
FIG. 16 illustrates a series of communications between various devices promoting a linkable emoji associated with an event for use in a real-time message in accordance with one embodiment.

Referring now to FIG. 16, a sequence of communications 1600 between various devices are shown promoting a linkable emoji associated with an event for use in a real-time message in accordance with one embodiment. The illustrated sequence of communications 1600 show one scenario in which a messaging server distributes a linkable emoji associated with an event being promoted on both social network servers and content servers. The illustrated sequence of events is provided as an example for illustrative purposes. In other embodiments, a similar distribution process of linkable emoji may be obtained via a different sequence of events and/or operations.

Beginning the illustrated sequence of communications 1600, a content server begins with the creation 1610 of new event content. The event is published 1611 to a variety of social network servers in an effort to promote the new event. The content server also generates 1612 a new event emoji image. Then the content server requests 1613 the messaging server for a linkable emoji to associate with the event. The request may include the proposed event emoji image. The messaging server generates 1614 a linked emoji associated with the event content. Next, the messaging server shares 1615 the event emoji with at least one client device in accordance with one embodiment. The client device adds 1616 the event emoji to the local datastore as a shared emoji. If a user of the client device clicks 1617 on the event emoji, the client device may optionally redirect 1618 to related event social media content on the social network servers and/or redirect 1619 to event content on the content server. In one embodiment, the client device broadcasts positive user actions, such as ticket or album purchases to at least one of the content server and/or the social network server. When the user writes an emoji message, the client device may also offer 1620 to share the event emoji in the emoji message. Additionally, the client device may encourage a user to optionally distribute 1621 the event emoji using the user's social media network channels on the social media servers.

Figure 17:
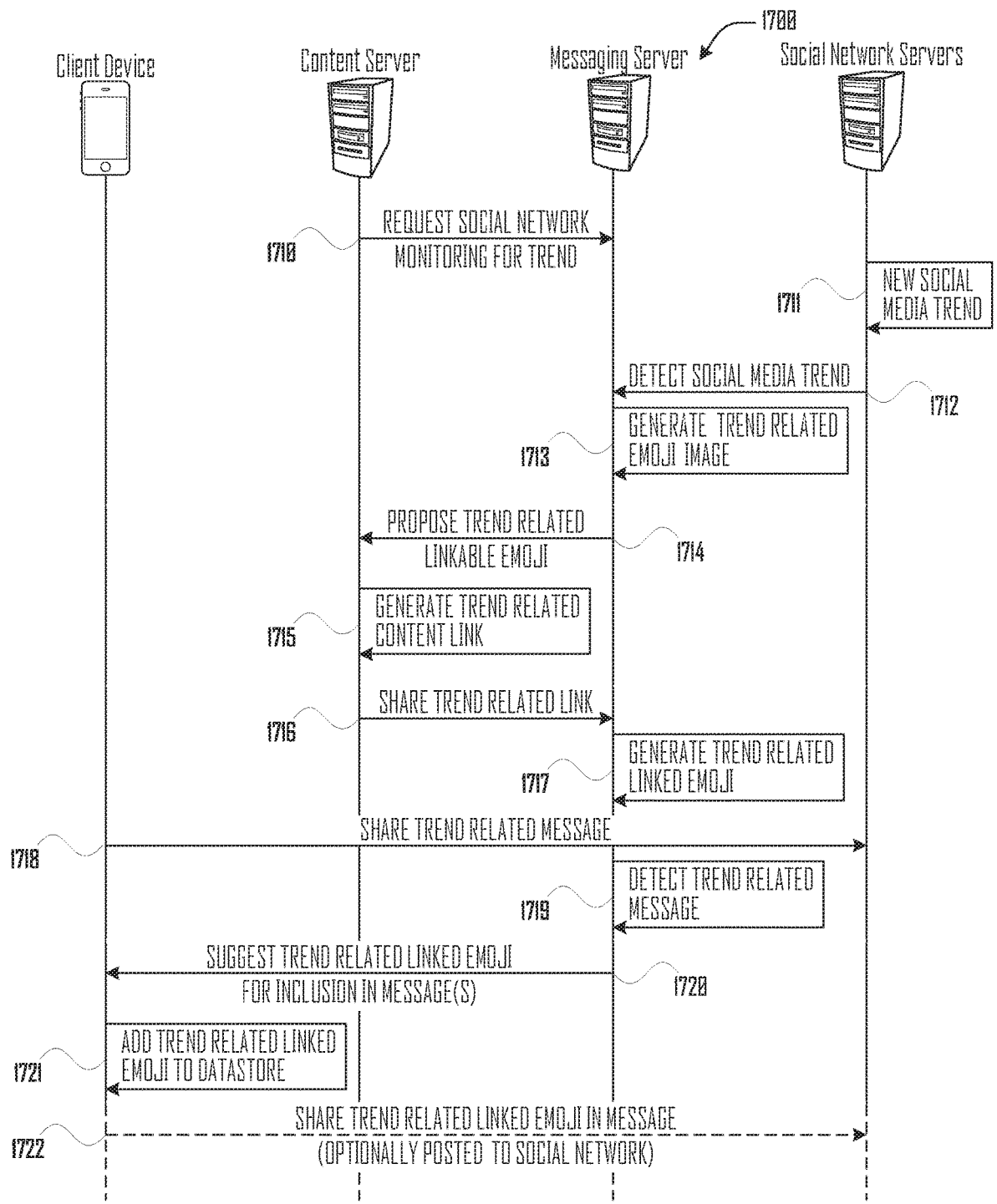
FIG. 17 illustrates a series of communications between various devices identifying a trend to be associated with a linkable emoji for use in a real-time message in accordance with one embodiment.

Referring now to FIG. 17, a sequence of communications 1700 between various devices are shown identifying a trend to be associated with a linkable emoji for use in a real-time message in accordance with one embodiment. The illustrated sequence of communications 1700 show one scenario in which a messaging server detects a social trend and generates a linkable emoji associated with the trend. The illustrated sequence of events is provided as an example for illustrative purposes. In other embodiments, a similar identification and distribution process of trend related linkable emoji may be obtained via a different sequence of events and/or operations.

Beginning the illustrated sequence of communications 1700, a content server begins by requesting 1710 monitoring by the messaging server of designated social network servers for desired trends or activities. After a new social media trend is spawned 1711 on the social network servers, the messaging detects 1712 that the new trend fortuitously matches the desired request. Alternatively, in one embodiment, the messaging server could monitor the social network servers for any new social media trends and present any relevant trends for consideration by the content server. Once the trend is detected, messaging server generates 1713 a trend related emoji image. Afterwards the messaging server proposes 1714 the trend related linkable emoji for consideration by the content server. The content server finds related content and generates 1715 a trend related content link and shares 1716 the trend related content link with the messaging server. The messaging server generates 1717 a trend related linked emoji.

Whenever a client device shares 1718 a trend related message on a social network server, the messaging server detects 1719 the trend related message and suggests 1720 the trend related linked emoji to the client device for inclusion in trend related messages. The client device adds 1721 the trend related linked emoji to the datastore. Once added to the local datastore, the client device can share 1722 the trend related linked emoji in messages and optionally post to social networks.

Figure 18:
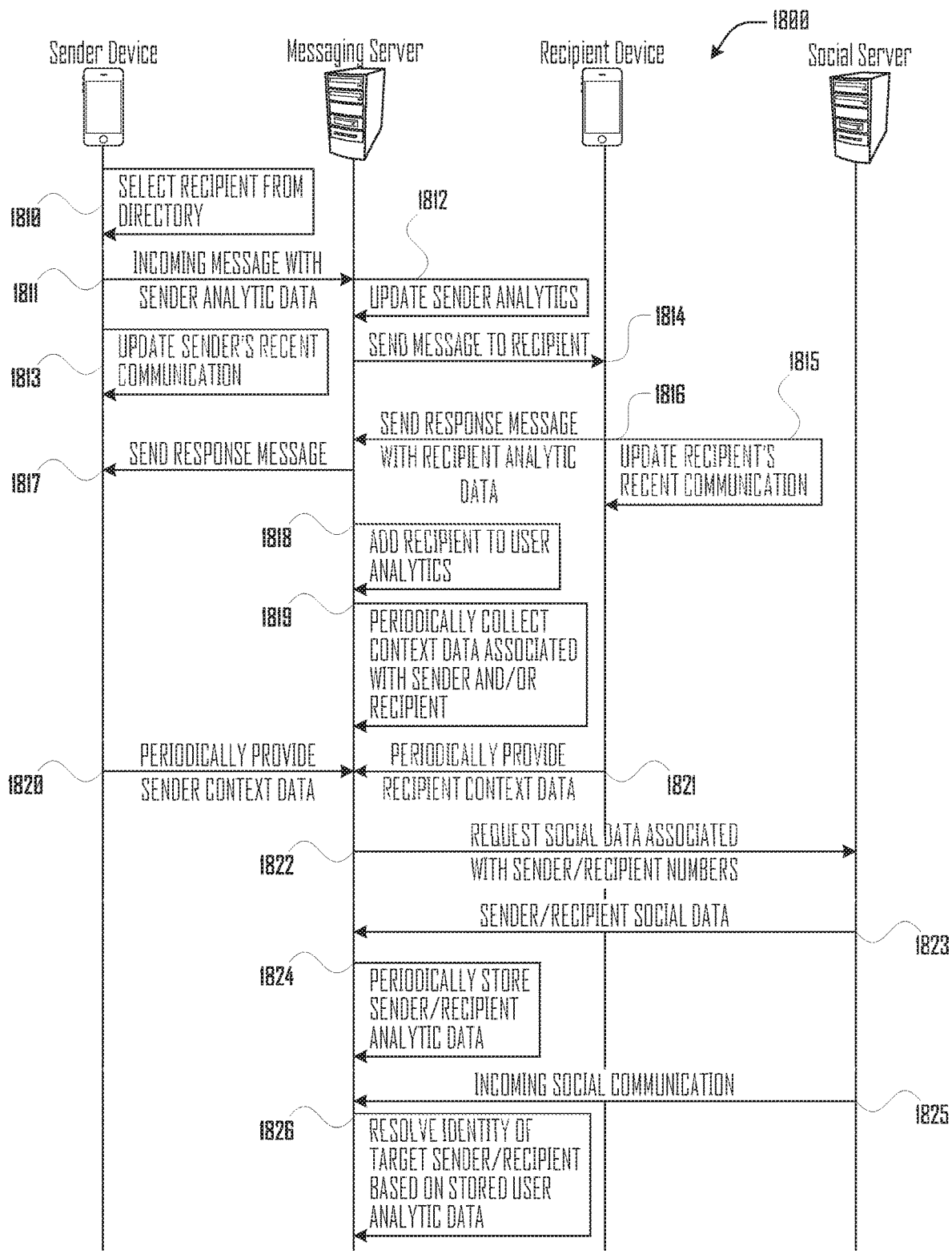
FIG. 18 illustrates a series of communications between various devices collecting contextual data related to a linkable emoji based on use in real-time messages in accordance with one embodiment.

Referring now to FIG. 18, a sequence of communications 1800 between various devices are shown collecting contextual data related to a linkable emoji based on use in real-time messages in accordance with one embodiment. The illustrated sequence of communications 1800 show one scenario in which a messaging server detects and collects contextual and analytic data related to a linkable emoji. The illustrated sequence of events is provided as an example for illustrative purposes. In other embodiments, a similar data collection process may be obtained via a different sequence of events and/or operations.

Beginning the illustrated sequence of communications 1800, a sender device selects 1810 a recipient from a directory. The sender device sends 1811 a message to a recipient that includes hidden embedded analytic data and updates 1813 sender's recent communication log. In one embodiment, the analytic data includes sender device information. Collected device information may include the data network type, such as cellular, direct, or wireless being used to send the message. Additionally, geographic location, device and user information may also be included. The messaging server updates 1812 the sender analytics in the datastore and sends 1814 the message to a recipient device. In one embodiment, the messaging server strips the message of analytics content prior to relaying the message to the recipient device. The recipient device sends 1816 a response message with recipient analytic data and updates 1815 recipient's recent communication. The messaging server adds 1818 the recipient analytics to the datastore and sends 1817 the response message to the sender device.

Once added, the messaging server periodically collects 1819 and stores 1824 contextual and other analytic data associated with sender device and/or recipient device. In response, the sender device periodically provides 1820 sender context data and the recipient device periodically provides 1821 recipient context data. The messaging server may also request 1822 additional social data associated with sender/recipient from a social server. In response, the social server may provide 1823 sender/recipient social data. Once identified by the social server, the messaging server can identify incoming social communication 1825 and resolve 1826 the identity of the target sender/recipient sending/receiving the social communication based on stored user analytic data.

Referring now to FIG. 22, side by side screenshots show a sender mobile messaging device 2205 and a recipient mobile messaging device 2210 exchanging real-time messages to share at least one content link associated with an embedded linkable emoji in accordance with one embodiment. In the illustrated screenshots, the sender mobile messaging device 2205 sends a message with an embedded linkable emoji and the recipient mobile messaging device 2210 clicks the linkable emoji. The recipient mobile messaging device 2210 detects the link and queries the user for how to "Complete Requested Action using:" by requesting designation of a browser to follow the link.

Referring now to FIG. 23, side by side screenshots show a sender mobile messaging device 2305 and a recipient mobile messaging device 2310 exchanging real-time messages to share content associated with an embedded linkable emoji sent in a real-time message in accordance with one embodiment. The sender mobile messaging device 2305 recommends a restaurant with a linkable emoji. The recipient mobile messaging device 2310 views the linked content and responds that the restaurant "Looks Great!" and proposes a time to meet the sender (as shown on the screen of the sender mobile messaging device 2305).

Figure 24:
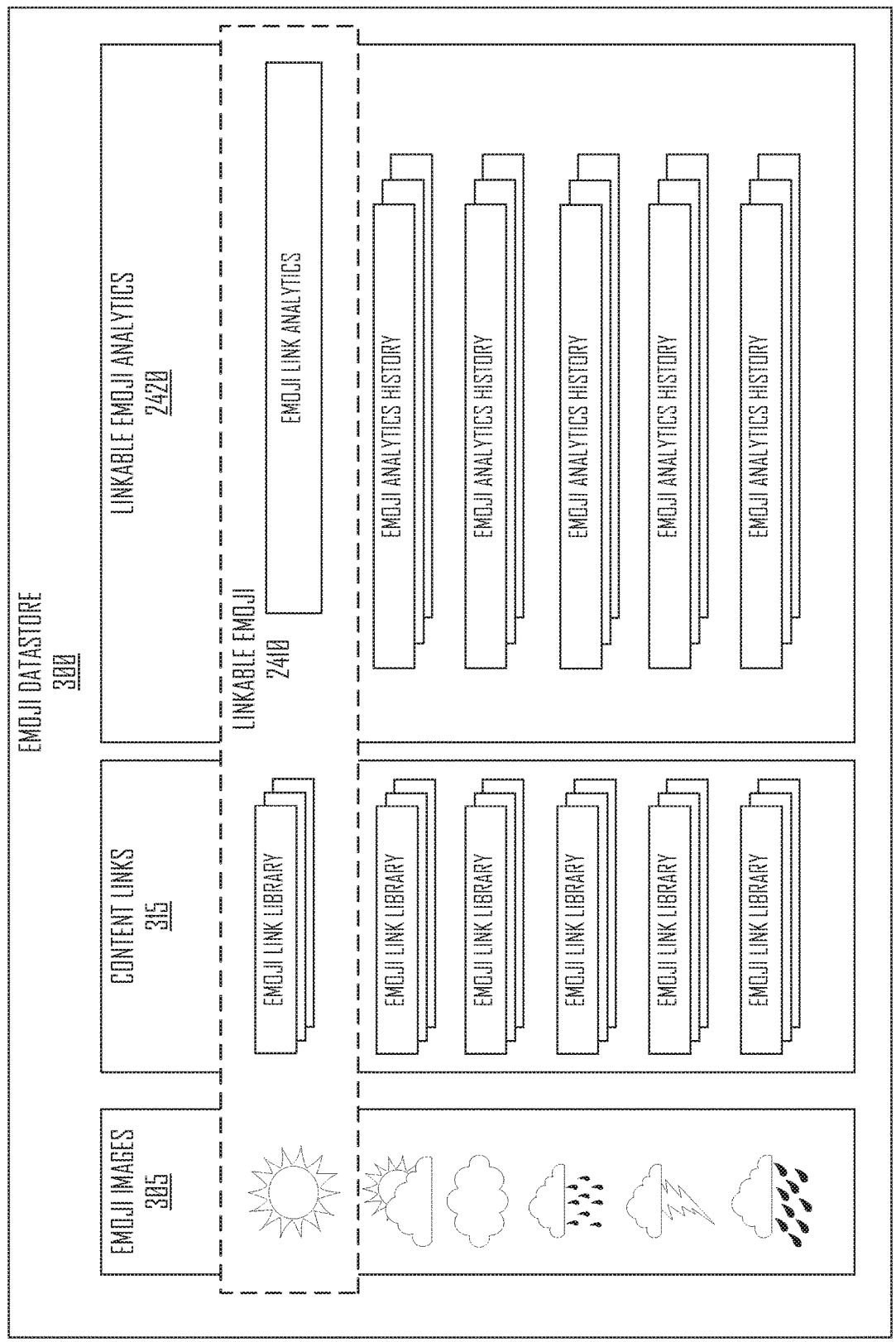
FIG. 24 illustrates several components of a emoji datastore in accordance with at least one embodiment.

Referring now to FIG. 24, several components of a linkable emoji 2410 are shown stored in an emoji datastore 300 in accordance with at least one embodiment. As previously discussed, the emoji datastore 300 includes emoji images 305, content links 315, and linkable emoji analytics 2420. Each linkable emoji 2410 in the emoji datastore 300 includes at least one emoji image (e.g., sun), a related emoji link library, and emoji link analytics. The linkable emoji 2410 may also include a text pattern corresponding to the emoji. The emoji link analytics may include conditional parameters, spoliation factors, emoji analytics history, and other information regarding the use, link(s), and content associated with the emoji. This information may be used by interested parties to evaluate the relative social traction and effectiveness of a particular emoji.

Referring now to FIG. 25, several components of a conditional linkable emoji 2510 are shown stored in an emoji datastore 300 in accordance with at least one embodiment. The emoji datastore 300 includes emoji images 305, content links 315, and conditional link analytics 2550. The conditional linkable emoji 2510 includes an emoji image 2515, emoji link library 2520, and conditional emoji link conditions 2525. The illustrated embodiment shows an emoji created for an artist. The emoji link library 2520 includes an artist fan link 2555, artist related concert ticket link(s) 2560, artist related album link(s) 2565, and artist related performance concert link(s) 2570. The artist fan link 2555 is the default link 2530. Based on the related conditional emoji link conditions 2535, the artist related concert ticket link(s) 2560 becomes the active link whenever the client device indicates that the device is within 50 miles of a concert location and the concert date is less than 30 days away and the concert is not sold out. The artist related album link(s) 2565 become the active link(s) whenever the related conditional emoji link conditions 2540 indicate the client device is within 50 miles of a concert location and the concert date is less than 30 days away but the concert is not sold out. The artist related performance concert link(s) 2570 become the active link(s) whenever the related conditional emoji link conditions 2545 indicate the client device is within 50 miles of a concert location and the concert date is more than 30 days away and the concert is sold out.

Although specific embodiments have been illustrated and described herein, a whole variety of alternate and/or equivalent implementations may be substituted for the specific embodiments shown and described without departing from the scope of the present disclosure. This application is intended to cover any adaptations or variations of the embodiments discussed herein.

What is claimed is:

1. A computer-implemented method to provide linkable emoji in messages, the method comprising:
   receiving a message request from a first client device to generate a message to a second client device including at least one linkable emoji for insertion into the requested message, wherein the receiving the message request includes receiving at least one spoliation parameter associated with the at least one linkable emoji;

determining a link library associated with the at least one linkable emoji;

identifying at least one multi-conditional content link associated with the at least one linkable emoji within the determined link library;

transmitting the requested message to the second client device, wherein upon viewing of the requested message at the second client device the at least one linkable emoji is conditionally presented within the requested message based at least in part on the at least one spoliation parameter and/or any updates to the at least one linkable emoji provided in a datastore accessible by the second client device; and responsive to a conditional linked content request from the second client device, selecting at least one content link for the at least one linkable emoji for the requested message based in part upon one or more current conditions and the at least one multi-conditional content link, and providing access to content associated with the selected at least one content link.

2. The computer-implemented method of claim 1, further comprising:

receiving the requested message at a server;

parsing the requested message by the server to collect contextual data from the requested message, wherein the contextual data contains the spoliation parameter.

3. The computer-implemented method of claim 2, further comprising:

determining an emoji message spoliation status by the server based at least in part upon the spoliation parameter, the emoji message spoliation status corresponding to the at least one linkable emoji.

4. The computer-implemented method of claim 3, further comprising:

identifying, by the server, at least one message spoliation limitation associated with the at least one linkable emoji via the spoliation parameter, the at least one message spoliation limitation associated with a plurality of conditional links, the identifying including selecting at least one of the plurality of conditional links and placing the selected at least one of the plurality of conditional links within the linkable emoji.

5. The computer-implemented method of claim 1, wherein the generated message with the at least one linkable emoji includes a conditional multilink emoji and wherein said generating the message includes determining which link of the conditional multilink emoji should be designated.

6. The computer-implemented method of claim 1, wherein at least one spoliation parameter is received from a user.

7. The computer-implemented method of 1, further comprising receiving the at least one linkable emoji from a local datastore.

8. The computer-implemented method of 1, wherein an alternative linkable emoji is provided when an emoji image or the at least one content link is unavailable.

9. The computer-implemented method of claim 8, wherein the alternative linkable emoji is downloadable for inclusion in a local datastore.

10. One or more non-transitory computer readable medium having a plurality of instructions stored thereon which, when executed by one or more processors, cause the one or more processors to perform a method, the method comprising:

receiving a message request from a first client device to generate a message to a second client device including at least one linkable emoji for insertion into the requested message, wherein the receiving the message request includes receiving at least one spoliation parameter associated with the at least one linkable emoji;

determining a link library associated with the at least one linkable emoji;

identifying at least one multi-conditional content link associated with the at least one linkable emoji based at least in part upon the determined link library;

generating at least one content link for the at least one linkable emoji for the requested message based in part upon the at least one multi-conditional content link;

generating the requested message with the at least one linkable emoji;

transmitting the generated requested message to the second client device, wherein upon viewing of the requested message at the second client device the at least one linkable emoji is conditionally presented within the requested message based at least in part on the at least one spoliation parameter and/or any updates to the at least one linkable emoji provided in a datastore accessible by the second client device;

collecting contextual data from the requested message, wherein the contextual data contains the spoliation parameter;

identifying at least one message spoliation limitation associated with the at least one linkable emoji via the spoliation parameter, the at least one message spoliation limitation associated with a plurality of conditional links, the identifying including selecting at least one of the plurality of conditional links and placing the selected at least one of the plurality of conditional links within the linkable emoji; and responsive to a conditional linked content request from the second client device, providing access to content associated with the selected at least one of the plurality of content links.

11. The one or more non-transitory computer readable medium of claim 10, further comprising:

extracting analytic data from at least one communication, the analytic data identifying a network type identifier; and storing the analytic data.

12. The one or more non-transitory computer readable medium of claim 11, further comprising:

receiving an emoji insertion request to include at least one linkable emoji within the requested message, each linkable emoji configured to include an emoji image for insertion into the requested message and at least one content link, the at least one linkable emoji including a respective spoliation parameter associated with a respective emoji image.

13. The one or more non-transitory computer readable medium of claim 12, further comprising:

generating the at least one content link for the at least one linkable emoji for the respective requested message based in part on one or more of (i) extracted analytic information, (ii) at least one default content link, and (iii) at least one multi-conditional content link, to direct to additional content associated with each linkable emoji; and generating the requested message with the at least one linkable emoji.

14. The one or more non-transitory computer readable medium of claim 13, further comprising:

transmitting the requested message;

receiving the requested message at a server; and parsing the requested message by the server to collect additional contextual data related to the at least one linkable emoji from the requested message, the additional contextual data including an emoji spoliation parameter.

15. The one or more non-transitory computer readable medium of claim 14, further comprising:
   determining an emoji message spoliation status identifying one or more determined spoliation parameters by the server based at least in part upon the one or more spoliation parameters, the spoliation status corresponding to the at least one linkable emoji.

16. The one or more non-transitory computer readable medium of claim 15, further comprising:
   transmitting the generated requested message including the at least one linkable emoji from the server to at least one target client device.

17. The one or more non-transitory computer readable medium of claim 10, wherein the generated message includes at least one linkable emoji, each linkable emoji including two or more emoji images and/or two or more content links to be designated, after transmitting the generated message, based on collected information.

18. A linkable emoji messaging system, comprising:
   one or more processors; and
   one or more non-transitory computer readable medium having a plurality of instructions stored thereon, which, when executed by the one or more processors, cause the system to perform a method, the method comprising:
      receiving a message request from a first client device to generate a message to a second client device including at least one linkable emoji for insertion into the requested message, wherein the receiving the message request includes receiving at least one spoliation parameter associated with the at least one linkable emoji;
      determining a link library associated with the at least one linkable emoji;
      identifying at least one multi-conditional content link associated with the at least one linkable emoji based at least in part upon the determined link library;
      generating at least one content link for the at least one linkable emoji for the requested message based in part upon the at least one multi-conditional content link;
      generating the requested message with the at least one linkable emoji;
      transmitting the generated requested message to the second client device, wherein upon viewing of the requested message at the second client device the at least one linkable emoji is conditionally presented within the requested message based at least in part on the at least one spoliation parameter and/or any updates to the at least one linkable emoji provided in a datastore accessible by the second client device;
      collecting contextual data from the requested message, wherein the contextual data contains the spoliation parameter;
      identifying at least one message spoliation limitation associated with the at least one linkable emoji via the spoliation parameter, the at least one message spoliation limitation associated with a plurality of conditional links, the identifying including selecting at least one of the plurality of conditional links and placing the selected at least one of the plurality of conditional links within the linkable emoji; and
      responsive to a conditional linked content request from the second client device, providing access to content associated with the selected at least one of the plurality of content links.

19. The linkable emoji messaging system of claim 18, including creating a new linkable emoji having a new emoji image and a new content link and adding the new linkable emoji to a datastore for inclusion in future messages.

20. The computer-implemented method of claim 1, comprising:
   generating a category search field at the first client device enabling user selection of a search target from one or more search targets presented therein, and presenting one or more linkable emoji options for the selected search target based on at least one categorical search metric.

21. The computer-implemented method of claim 20, comprising:
   enabling a further one or more linkable emoji options to be newly established via input from the first client device, the input including at least an image to be associated with the respective linkable emoji and a defined link to be stored in the link library in association with the image.

22. The computer-implemented method of claim 21, comprising:
   upon determining that a similar linkable emoji option already exists with respect to a newly established linkable emoji option, prompting the first client device for authorization to update and replace the existing linkable emoji option with the newly established linkable emoji option.

23. The one or more non-transitory computer readable medium of claim 10, comprising:
   generating a category search field at the first client device enabling user selection of a search target from one or more search targets presented therein, and presenting one or more linkable emoji options for the selected search target based on at least one categorical search metric.

24. The one or more non-transitory computer readable medium of claim 23, comprising:
   enabling a further one or more linkable emoji options to be newly established via input from the first client device, the input including at least an image to be associated with the respective linkable emoji and a defined link to be stored in the link library in association with the image.

25. The one or more non-transitory computer readable medium of claim 24, comprising:
   upon determining that a similar linkable emoji option already exists with respect to a newly established linkable emoji option, prompting the first client device for authorization to update and replace the existing linkable emoji option with the newly established linkable emoji option.

26. The linkable emoji messaging system of claim 18, comprising:
   generating a category search field at the first client device enabling user selection of a search target from one or more search targets presented therein, and presenting one or more linkable emoji options for the selected search target based on at least one categorical search metric.

27. The linkable emoji messaging system of claim 26, comprising:

enabling a further one or more linkable emoji options to be newly established via input from the first client device, the input including at least an image to be associated with the respective linkable emoji and a defined link to be stored in the link library in association with the image.

28. The linkable emoji messaging system of claim 27, comprising:

upon determining that a similar linkable emoji option already exists with respect to a newly established linkable emoji option, prompting the first client device for authorization to update and replace the existing linkable emoji option with the newly established linkable emoji option.

* * * * *